US012794513B2

(12) United States Patent
Kim et al.

(10) Patent No.: US 12,794,513 B2
(45) Date of Patent: Nov. 10, 2026

(54) METHOD AND DEVICE FOR DESIGNING RIS CONTROL SIGNAL IN WIRELESS COMMUNICATION SYSTEM

(71) Applicant: SAMSUNG ELECTRONICS CO., LTD., Suwon-si (KR)

(72) Inventors: Donggu Kim, Suwon-si (KR); Woojae Jeong, Suwon-si (KR); Seunghyun Lee, Suwon-si (KR); Juho Lee, Suwon-si (KR); Jungsoo Jung, Suwon-si (KR); Hanjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 18/700,670

(22) PCT Filed: Oct. 12, 2022

(86) PCT No.: PCT/KR2022/015405
§ 371 (c)(1),
(2) Date: Apr. 11, 2024

(87) PCT Pub. No.: WO2023/063721
PCT Pub. Date: Apr. 20, 2023

(65) Prior Publication Data

US 2025/0007565 A1 Jan. 2, 2025

(30) Foreign Application Priority Data

Oct. 15, 2021 (KR) ........................ 10-2021-0137634

(51) Int. Cl.
*H04B 7/04* (2017.01)
*H04W 56/00* (2009.01)

(52) U.S. Cl.
CPC ...... *H04B 7/04013* (2023.05); *H04W 56/001* (2013.01)

(58) Field of Classification Search
CPC ......................... H04B 7/04013; H04W 56/001
(Continued)

(56) References Cited

U.S. PATENT DOCUMENTS 11,522,648 B2 * 12/2022 Kim ...................... H04L 5/0007
2020/0350691 A1 11/2020 Somerlock, III et al.
(Continued)

FOREIGN PATENT DOCUMENTS

KR 10-2192234 B1 12/2020
WO WO-2020254031 A1 * 12/2020 ............ H04B 7/088
(Continued)

OTHER PUBLICATIONS

Wu et al., "Intelligent Reflecting Surface Aided Wireless Communications: A Tutorial," arXiv:2007.02759v2, Jul. 7, 2020, 74 pages.
(Continued)

*Primary Examiner* — Sam K Ahn

(57) ABSTRACT

Disclosed is a network entity including a transceiver; a memory storing one or more instructions; and at least one processor configured to execute the one or more instructions stored in the memory, wherein the at least one processor is configured to receive, from a base station (BS), a reconfigurable intelligent surface (RIS) control signal including RIS reflective pattern information and configuration information for the RIS reflective pattern information, and control a reflective pattern of an RIS based on the RIS reflective pattern information and the configuration information for the RIS reflective pattern information.

11 Claims, 50 Drawing Sheets

(58) Field of Classification Search
USPC .......................................................... 455/507
See application file for complete search history.

(56) References Cited

U.S. PATENT DOCUMENTS

| | | | | |
|---|---|---|---|---|
| 2021/0013619 | A1* | 1/2021 | Alkhateeb .......... | H04B 7/04013 |
| 2021/0126359 | A1 | 4/2021 | Kim et al. | |
| 2023/0107283 | A1 | 4/2023 | Park et al. | |

FOREIGN PATENT DOCUMENTS

| | | | |
|---|---|---|---|
| WO | 2021172631 | A1 | 9/2021 |
| WO | 2021207748 | A2 | 10/2021 |

OTHER PUBLICATIONS

Abeywickrama et al., "Intelligent Reflecting Surface: Practical Phase Shift Model and Beamforming Optimization," arXiv:1907. 06002v4, Feb. 25, 2020, 7 pages.

Jung et al, "On the Optimality of Reconfigurable Intelligent Surfaces (RISs): Passive Beamforming, Modulation, and Resource Allocation," arXiv:1910.00968v2, Feb. 4, 2021, 33 pages.

International Search Report and Written Opinion of the International Searching Authority dated Jan. 25, 2023, in connection with International Application No. PCT/KR2022/015405, 8 pages.

* cited by examiner

FIG. 3A

| $b_0^{(s)} b_1^{(s)} \ldots b_{\lceil \log_2 M \rceil - 1}^{(s)}$ | RIS CODEWORD INDEX | $b_0^{(s)} b_1^{(s)} \ldots b_{\lceil \log_2 M \rceil - 1}^{(s)}$ | RIS CODEWORD INDEX |
|---|---|---|---|
| $b_0^{(0)} b_1^{(0)}$ | 00 | $b_0^{(7)} b_1^{(7)}$ | 01 |
| $b_0^{(1)} b_1^{(1)}$ | 00 | $b_0^{(8)} b_1^{(8)}$ | 10 |
| $b_0^{(2)} b_1^{(2)}$ | 00 | $b_0^{(9)} b_1^{(9)}$ | 10 |
| $b_0^{(3)} b_1^{(3)}$ | 00 | $b_0^{(10)} b_1^{(10)}$ | 10 |
| $b_0^{(4)} b_1^{(4)}$ | 00 | $b_0^{(11)} b_1^{(11)}$ | 10 |
| $b_0^{(5)} b_1^{(5)}$ | 01 | $b_0^{(12)} b_1^{(12)}$ | 11 |
| $b_0^{(6)} b_1^{(6)}$ | 01 | $b_0^{(13)} b_1^{(13)}$ | 11 |

FIG. 5D

| Bit field | STARTING SYMBOL |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |

FIG. 5E

| Bit field | SYMBOL LENGTH (NUMBER) |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |

FIG. 6B 001001001001 101101 000000 100100100 011011011

FIG. 6C

| INDICATE P=5 | FIRST BITMAP | SECOND BITMAP |
|---|---|---|
| 0101 | 001 101 000 010 011 | 10001010100100 |

FIG. 6D

| INDICATE P=5 | FIRST BITMAP | SECOND BITMAP |
|---|---|---|
| 0101 | 001 101 000 010 011 | 0000 0100 0110 1000 1011 |

FIG. 7B

| |
|---|
| 001001001001 101101 000000 100100100 011011011 |

FIG. 7C

| INDICATE P=8 | FIRST BITMAP | SECOND BITMAP |
|---|---|---|
| 1000 | 000 001 000 101 000 010 011 000 | 11010101100101 |

METHOD AND DEVICE FOR DESIGNING RIS CONTROL SIGNAL IN WIRELESS COMMUNICATION SYSTEM

TECHNICAL FIELD

The disclosure relates to a method and device for designing a reconfigurable intelligent surface (RIS) control signal in a wireless communication system.

BACKGROUND ART

Looking back through successive generations at a process of development of radio communication, technologies for human-targeted services such as voice, multimedia, data or the like have been developed. Connected devices that are on the explosive rise after commercialization of fifth-generation (5G) communication systems are expected to be connected to communication networks. As examples of things connected to networks, there may be cars, robots, drones, home appliances, displays, smart sensors installed in various infrastructures, construction machinery, factory equipment, etc. Mobile devices are expected to evolve into various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop better 6G communication systems. For these reasons, 6G communication systems are referred to as beyond-5G systems.

In the 6G communication system expected to become a reality by around 2030, a maximum transfer rate is tera bits per second (bps), i.e., 1000 giga bps, and a maximum wireless delay is 100 micro seconds (usec). In other words, compared to the 5G communication system, the transfer rate becomes 50 times faster and the wireless delay is reduced to a tenth (1/10) in the 6G communication system.

To attain these high data transfer rates and ultra-low delay, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band introduced in 5G systems, importance of technology for securing a signal range, i.e., coverage, is expected to grow. As major technologies for securing coverage, radio frequency (RF) elements, antennas, new waveforms superior to orthogonal frequency division multiplexing (OFDM) in terms of coverage, beamforming and massive multiple-input and multiple-output (massive MIMO), full dimensional MIMO (FFD-MIMO), array antennas, multiple antenna transmission technologies such as large scale antennas, etc., need to be developed. Besides, new technologies for increasing coverage of THz band signals, such as metamaterial based lenses and antennas, a high-dimensional spatial multiplexing technique using orbital angular momentum (OAM), reconfigurable intelligent surface (RIS), etc., are being discussed.

Furthermore, in order to enhance frequency efficiency and system networks, a full duplex technology by which both uplink and downlink transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience become possible through hyper-connectivity of the 6G communication system including not only connections between things but also connections between humans and things. Specifically, it is predicted that services such as truly immersive extended reality (truly immersive XR), high-fidelity mobile hologram, digital replica, etc., may be provided. Furthermore, services such as remote surgery, industrial automation and emergency response with enhanced security and reliability may be provided through the 6G communication system to be applied in various areas such as industry, medical care, vehicles, appliances, etc.

DISCLOSURE

Technical Problem

The disclosure provides a method and device for designing a reconfigurable intelligent surface (RIS) control signal in a wireless communication system.

Technical Solution

According to an embodiment of the disclosure, a network entity may include a transceiver; a memory storing one or more instructions; and at least one processor configured to execute the one or more instructions stored in the memory, wherein the at least one processor is configured to receive, from a base station (BS), a reconfigurable intelligent surface (RIS) control signal including RIS reflective pattern information and configuration information for the RIS reflective pattern information, and control a reflective pattern of an RIS based on the RIS reflective pattern information and the configuration information for the RIS reflective pattern information.

Furthermore, in an embodiment of the disclosure, the configuration information for the RIS reflective pattern information may include information about a slot offset, and the at least one processor may be configured to control a reflective pattern of the RIS for each symbol based on the RIS reflective pattern information from a slot after the slot offset elapses from a reception time of the RIS control signal.

Furthermore, in an embodiment of the disclosure, the RIS reflective pattern information may include information about a reflective pattern corresponding to each symbol in the slot, and the at least one processor may be configured to control a reflective pattern of the RIS for each symbol based on the reflective pattern corresponding to each symbol.

Furthermore, in an embodiment of the disclosure, the RIS reflective pattern information may include information about a number of reflective patterns corresponding to the slot and information about a set of reflective patterns sequentially corresponding to symbols in the slot, the configuration information for the RIS reflective pattern information may include information about a starting symbol corresponding to each reflective pattern in the set of reflective patterns, and the at least one processor may be configured to control a reflective pattern of the RIS for each symbol based on the information about the number of reflective patterns corresponding to the slot, the information about the set of reflective patterns sequentially corresponding to the symbols in the slot, and the information about a starting symbol corresponding to each reflective pattern in the reflective pattern set.

Furthermore, in an embodiment of the disclosure, the RIS reflective pattern information may include information about a number of reflective patterns corresponding to a slot and information about a set of reflective patterns sequentially corresponding to symbols in the slot, the configuration information for the RIS reflective pattern information may include information about symbol length corresponding to each reflective pattern in the set of reflective patterns, and the at least one processor may be configured to control a reflective pattern of the RIS for each symbol based on the information about the number of reflective patterns corresponding to the slot, the information about the set of reflective patterns sequentially corresponding to the symbols in the slot, and the information about the symbol length corresponding to each reflective pattern in the set of reflective patterns.

Furthermore, in an embodiment of the disclosure, the RIS reflective pattern information may include information about at least one signal transmitted in each period, the configuration information for the RIS reflective pattern information may include information about the period, and at least one processor may be configured to control a reflective pattern of the RIS based on the information about the at least one signal in each period.

Furthermore, in an embodiment of the disclosure, the information about the at least one signal may include information about at least one reflective pattern corresponding to each of the at least one signal, the configuration information for the RIS reflective pattern information may include information about a system frame number (SFN) and a subframe number and information about a starting symbol and symbol length corresponding to each of the at least one reflective pattern, and the at least one processor may be configured to control a reflective pattern of the RIS based on the information about the at least one reflective pattern and the information about the starting symbol and the symbol length corresponding to each of the at least one reflective pattern in each period from the subframe number of the SFN.

Furthermore, in an embodiment of the disclosure, the information about the at least one signal may include information about at least one reflective pattern corresponding to each of the at least one signal, the configuration information for the RIS reflective pattern information may include information about a timing offset and information about a starting symbol and symbol length corresponding to each of the at least one reflective pattern, and the at least one processor may be configured to control a reflective pattern of the RIS based on the information about the at least one reflective pattern and the information about the starting symbol and the symbol length corresponding to each of the at least one reflective pattern in each period from when the timing offset elapses from a reception time of the RIS control signal.

Furthermore, in an embodiment of the disclosure, the at least one signal transmitted in each period may include a sync signal, and the at least one processor may be configured to receive configuration information for a sync signal from a BS, identify configuration information for a plurality of sync signals including the sync signal based on the configuration information for the sync signal, and control a reflective pattern of the RIS in each period based on information about a reflective pattern corresponding to each of the at least one of the plurality of sync signals and configuration information for the at least one sync signal.

Furthermore, in an embodiment of the disclosure, the at least one processor may be configured to identify when each of at least one physical random access channel (PRACH) occasion corresponding to each of the at least one sync signal occurs based on the configuration information for the sync signal, and control a reflective pattern of the RIS at a time when each PRACH occasion occurs in each period based on the information about the reflective pattern corresponding to each of the at least one sync signal.

Furthermore, in an embodiment of the disclosure, the RIS reflective pattern information may include information about a phase and amplitude corresponding to each of a plurality of reflection elements (REs) on the RIS.

According to another embodiment of the disclosure, a method of operating a network entity in a wireless communication system may include receiving, from a BS, an RIS control signal including RIS reflective pattern information and configuration information for the RIS reflective pattern information; and controlling a reflective pattern of an RIS based on the RIS reflective pattern information and the configuration information for the RIS reflective pattern information.

Furthermore, in an embodiment of the disclosure, the configuration information for the RIS reflective pattern information may include information about a slot offset, and the controlling of a reflective pattern of the RIS may include controlling a reflective pattern of the RIS for each symbol based on the RIS reflective pattern information from a slot after the slot offset elapses from a reception time of the RIS control signal.

Furthermore, in an embodiment of the disclosure, the RIS reflective pattern information may include information about a reflective pattern corresponding to each symbol in a slot, and the controlling of a reflective pattern of the RIS may include controlling a reflective pattern of the RIS for each symbol based on the reflective pattern corresponding to each symbol.

Furthermore, in an embodiment of the disclosure, the RIS reflective pattern information may include information about a number of reflective patterns corresponding to a slot and information about a set of reflective patterns sequentially corresponding to symbols in the slot, the configuration information for the RIS reflective pattern information may include information about a starting symbol corresponding to each reflective pattern in the set of reflective patterns, and the controlling of a reflective pattern of the RIS may include controlling a reflective pattern of the RIS for each symbol based on the information about the number of reflective patterns corresponding to the slot, the information about the set of reflective patterns sequentially corresponding to symbols in the slot, and the information about the starting symbol corresponding to each reflective pattern in the set of reflective patterns.

Furthermore, in an embodiment of the disclosure, the RIS reflective pattern information may include information about a number of reflective patterns corresponding to a slot and information about a set of reflective patterns sequentially corresponding to symbols in the slot, configuration information for the RIS reflective pattern information may include information about symbol length corresponding to each reflective pattern in the set of reflective patterns, and the controlling of a reflective pattern of the RIS may include controlling a reflective pattern of the RIS for each symbol based on the information about the number of reflective patterns corresponding to the slot, the information about the set of reflective patterns sequentially corresponding to symbols in the slot, and the information about the symbol length corresponding to each reflective pattern in the set of reflective patterns.

Furthermore, in an embodiment of the disclosure, the RIS reflective pattern information may include information about at least one signal transmitted in each period, the configuration information for the RIS reflective pattern information may include information about a period, and the controlling of a reflective pattern of the RIS may include controlling a reflective pattern of the RIS in each period based on the information about the at least one signal.

Furthermore, in an embodiment of the disclosure, the information about the at least one signal may include information about at least one reflective pattern corresponding to each of the at least one signal, the configuration information for the RIS reflective pattern information may include information about an SFN and a subframe number and information about a starting symbol and symbol length corresponding to each of the at least one reflective pattern, and the controlling of a reflective pattern of the RIS may include controlling a reflective pattern of an RIS based on the information about the at least one reflective pattern and the information about the starting symbol and the symbol length corresponding to each of the at least one reflective pattern in each period from the subframe number of the SFN.

Furthermore, in an embodiment of the disclosure, the information about the at least one signal may include information about at least one reflective pattern corresponding to each of the at least one signal, the configuration information for the RIS reflective pattern information may include information about a timing offset and information about a starting symbol and symbol length corresponding to each of the at least one reflective pattern, and the controlling of a reflective pattern of the RIS may include controlling a reflective pattern of the RIS based on the information about the at least one reflective pattern and the information about the starting symbol and the symbol length corresponding to each of the at least one reflective pattern in each period from when the timing offset elapses from a reception time of the RIS control signal.

Furthermore, in an embodiment of the disclosure, the at least one signal transmitted in each period may include a sync signal, and the method may include receiving configuration information for the sync signal from the BS; and identifying configuration information for a plurality of sync signals including the sync signal based on the configuration information for the sync signal, and the controlling of a reflective pattern of the RIS may include controlling a reflective pattern of the RIS in each period based on information about a reflective pattern corresponding to each of the at least one of the plurality of sync signals and configuration information for the at least one sync signal.

Furthermore, in an embodiment of the disclosure, the method may include identifying when each of at least one PRACH occasion corresponding to each of the at least one sync signal occurs based on the configuration information for the sync signal; and controlling a reflective pattern of an RIS at a time when each PRACH occasion occurs in each period based on the information about the reflective pattern corresponding to each of the at least one sync signal.

Furthermore, in an embodiment of the disclosure, the RIS reflective pattern information may include information about a phase and amplitude corresponding to each of a plurality of REs on the RIS.

According to another embodiment of the disclosure, a BS may include a transceiver; a memory storing one or more instructions; and at least one processor configured to execute the one or more instructions stored in the memory, wherein the at least one processor is configured to transmit, to a network entity, an RIS control signal including RIS reflective pattern information and configuration information for the RIS reflective pattern information.

According to another embodiment of the disclosure, a method of operating a BS in a wireless communication system may include transmitting, to a network entity, an RIS control signal including RIS reflective pattern information and configuration information for the RIS reflective pattern information.

DESCRIPTION OF DRAWINGS

FIG. 3A illustrates an example of an RIS control signal, according to an embodiment of the disclosure.

FIG. 5D illustrates an example of an RIS control signal, according to an embodiment of the disclosure.

FIG. 5E illustrates an example of an RIS control signal, according to an embodiment of the disclosure.

FIG. 6B illustrates a method of designing an RIS control signal, according to an embodiment of the disclosure.

FIG. 6C illustrates a method of designing an RIS control signal, according to an embodiment of the disclosure.

FIG. 6D illustrates a method of designing an RIS control signal, according to an embodiment of the disclosure.

FIG. 7B illustrates a method of designing an RIS control signal, according to an embodiment of the disclosure.

FIG. 7C illustrates a method of designing an RIS control signal, according to an embodiment of the disclosure.

MODE FOR INVENTION

Figure 1:
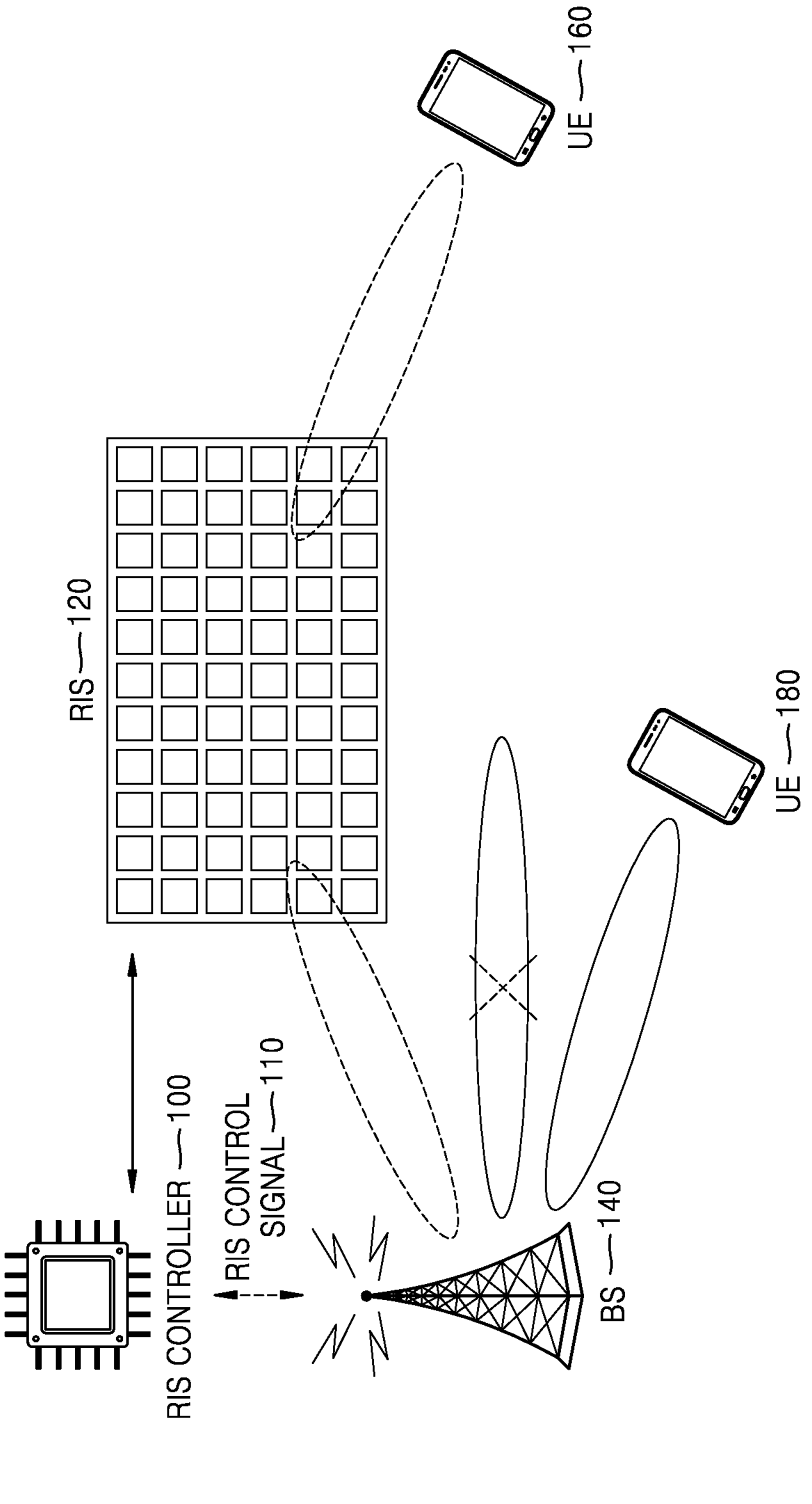
FIG. 1 illustrates a reconfigurable intelligence surface (RIS) based wireless communication system environment, according to an embodiment of the disclosure.

Operating principles of embodiments of the disclosure will now be described with reference to accompanying drawings. In the following descriptions of the disclosure, well-known functions or configurations are not described in detail because they would obscure the disclosure with unnecessary details. Further, the terms, as will be mentioned at a later time, are defined by taking functionalities in the disclosure into account, but may vary depending on practices or intentions of users or operators. Accordingly, the terms should be defined based on descriptions throughout this specification. Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each block and combination of the blocks of a flowchart may be performed by computer program instructions. The computer program instructions may be loaded onto a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memory that may direct the computers or other programmable data processing apparatus to function in a particular manner, such that the instructions stored in the computer-executable or computer-readable memory may produce an article of manufacture including instruction means that perform the functions specified in the flowchart blocks(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Descriptions of some well-known technologies that possibly obscure the disclosure will be omitted, if necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the 3rd generation partnership project (3GPP) long term evolution (LTE) will be used hereinafter. The disclosure is not, however, limited to the terms and definitions, and may equally apply to any systems that conform to other standards. In the disclosure, for convenience of explanation, eNode B (eNB) may be interchangeably used with gNode B (gNB). For example, a BS referred to as an eNB may also indicate a gNB. Furthermore, the term 'terminal' or 'user equipment (UE)' may refer not only to a cell phone, an NB-IoT device, and a sensor but also to another wireless communication device.

In the following description, a base station is an entity for performing resource allocation for a terminal, and may be at least one of a gNB, an eNB, a Node B, a base station (BS), a radio access unit, a base station controller, or a network node. The terminal may include a UE, a mobile station (MS), a cellular phone, a smart phone, a computer, or a multimedia system capable of performing a communication function. It is, of course, not limited thereto.

In the disclosure, a reconfigurable intelligence surface (RIS) refers to a device that forms reflective patterns with combinations of phases and/or amplitudes of respective reflecting elements (REs) included in a reflective plane and intelligently reflects an incident beam on the RIS in a desired direction according to the reflective patterns.

In the disclosure, an RIS codebook refers to a set of reflective patterns formed with combinations of phases and/or amplitudes of the respective REs included in the reflective plane of the RIS.

FIG. 1 illustrates an RIS based wireless communication system environment, according to an embodiment of the disclosure.

Referring to FIG. 1, the RIS based wireless communication system environment may include an RIS controller (or RC) 100, an RIS 120, a BS 140 and one or more UEs 160 and 180.

In an embodiment, the RIS controller 100 may generate a plurality of reflective patterns by combining a phase and/or amplitude corresponding to each of a plurality of REs included in a reflective plane of the RIS 120. For example, when the reflective plane of the RIS 120 includes N REs, the RIS controller 100 may generate the following M specific reflective patterns of the RIS by combining a phase and/or amplitude corresponding to each of the N REs.

$$\Phi_m = \{\beta_{m,1}e^{j\theta_{m,1}}, \beta_{m,2}e^{j\theta_{m,2}}, \ldots, \beta_{m,N}e^{j\theta_{m,N}}\}, m = 1, 2, \ldots, M$$

where β denotes an amplitude corresponding to each of N REs, θ denotes a phase corresponding to each of the N REs, and m denotes an RIS codeword index.

In an embodiment, the RIS controller 100 may be physically attached to the RIS 120 to control the RIS 120 or physically separated from the RIS 120 to control the RIS 120 through a control signal. It is, however, merely an example and how the RIS controller 100 controls the RIS 120 is not limited thereto.

Referring to FIG. 1, the one or more UEs 160 and 180 may or may not receive a signal transmitted by the BS 140 depending on their locations. For example, when the UE 180 is located in an area other than shades, the UE 180 may receive the signal transmitted by the BS 140. On the other hand, when the UE 160 is located in a shaded area, the UE 160 may not receive the signal transmitted by the BS 140. In this case, the RIS controller 100 may properly control a reflective pattern of the RIS 120 so that the UE 160 located in the shaded area is able to receive the signal transmitted by the BS 140. In other words, even though the UE 160 located in the shaded area may not directly receive the signal transmitted by the BS 140, it may receive a signal reflecting off the RIS 120.

In an embodiment of the disclosure, in a case that the BS 140 transmits a signal to the UE 160 through the RIS 120, the BS 140 may transmit an RIS control signal 110 to the RIS controller 100. For example, the BS 140 may transmit the RIS control signal 110 to the RIS controller 100 by L1 signaling or radio resource control (RRC) signaling. In this case, the BS 140 may configure a new physical control channel or a dedicated RIS control channel to transmit the RIS control signal 110, and transmit the RIS control signal 110 to the RIS controller 100 through the configured control channel. Alternatively, the BS 140 may transmit the RIS control signal 110 to the RIS controller 100 in a control resource set (CORESET). It is, however, merely an example and how the BS 140 transmits the RIS control signal 110 to the RIS controller 100 is not limited thereto.

In an embodiment of the disclosure, the RIS controller 100 may access the BS 140 according to a common initial access procedure before receiving the RIS control signal 110 from the BS 140. For example, the RIS controller 100 may receive a synchronization signal block (SSB) transmitted by the BS 140, and complete the initial access by performing a random access procedure based on the SSB. In this case, the RIS controller 100 may be connected to the BS 140 in the same band as a band in which the BS 140 provides services for the UE 160. (I.e., the RIS controller 100 may make an in-band connection to the BS 140.)

In an embodiment, the RIS controller 100 may control a reflective pattern of the RIS 120 based on the received RIS control signal 110 so that the UE 160 located in a shaded area is able to receive the signal transmitted by the BS 140. For example, the RIS controller 100 may reflect the signal transmitted by the BS 140 toward where the UE 160 is located by controlling a phase and/or amplitude corresponding to each of the plurality of REs based on the received RIS control signal 110.

Figure 2A:
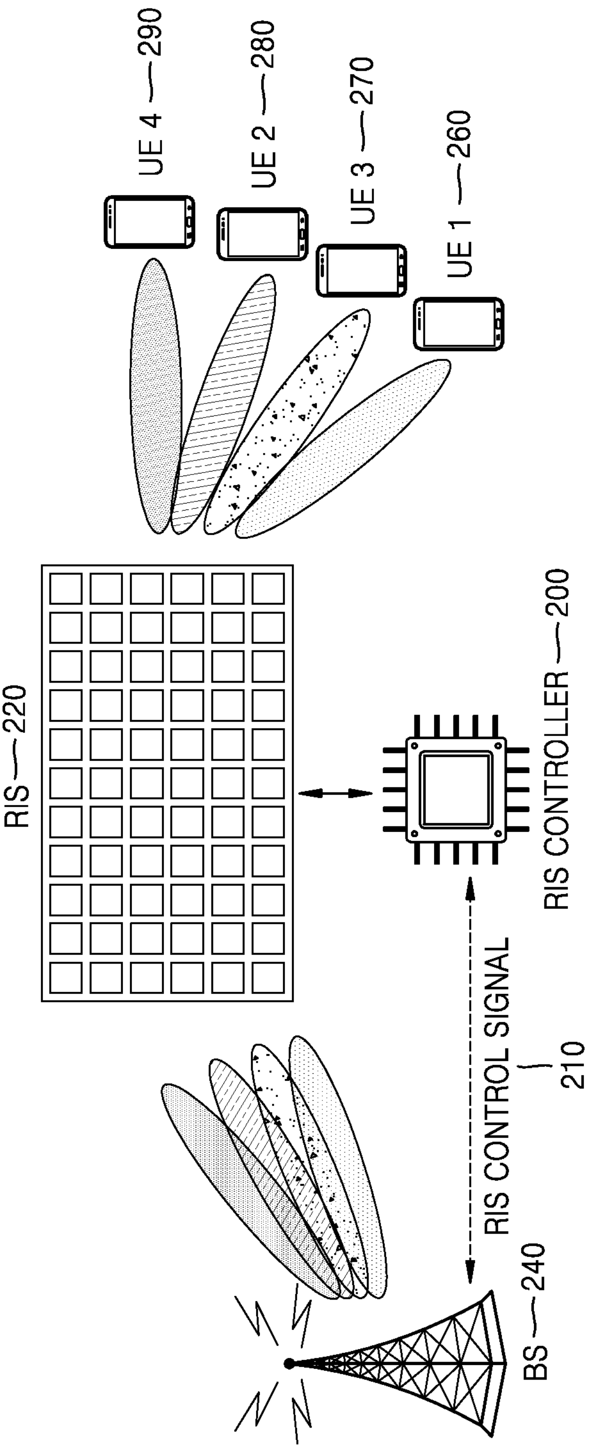
FIG. 2A illustrates an RIS based wireless communication system environment, according to an embodiment of the disclosure.
Figure 2B:
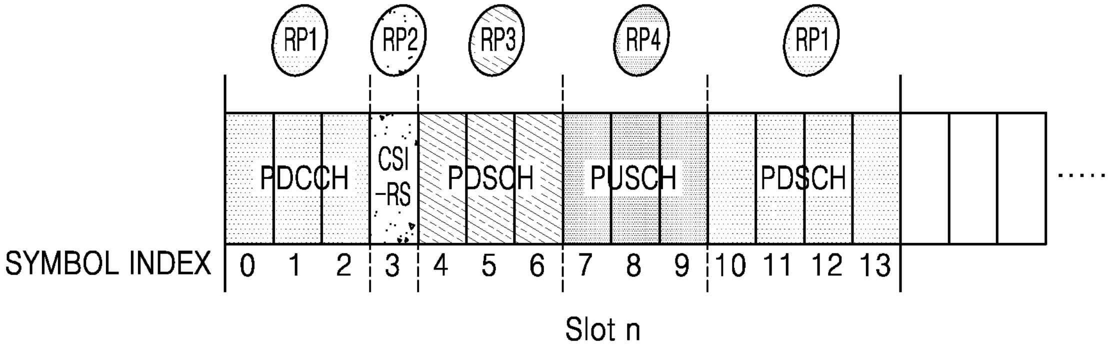
FIG. 2B illustrates an RIS based wireless communication system environment, according to an embodiment of the disclosure.

FIGS. 2A and 2B illustrate an RIS based wireless communication system environment, according to an embodiment of the disclosure.

Referring to FIG. 2A, the RIS based wireless communication system environment may include an RIS controller 200, an RIS 220, a BS 240 and a plurality of UEs 260 to 290 located in shaded areas.

In an embodiment, in a case that the BS 240 transmits signals to the plurality of UEs 260 to 290 through the RIS 220, the BS 240 may transmit an RIS control signal 210 to the RIS controller 200. In this case, the RIS control signal 210 may include RIS reflective pattern information corresponding to a location of each of the plurality of UEs 260 to 290 and configuration information for the RIS reflective pattern information.

Referring to FIG. 2B, the RIS controller 200 may control a reflective pattern of the RIS 220 for each symbol based on the received RIS control signal 210 so that each of the plurality of UEs 260 to 290 is able to receive the signal transmitted by the BS 240.

In an embodiment, in a case that the BS 240 transmits a physical downlink control channel (PDCCH) to UE 1 260 in symbols 0 to 2 of a slot n, the BS 240 may transmit, to the RIS controller 200, the RIS control signal 210 including RIS reflective pattern information corresponding to the location of UE 1 260 and configuration information (symbols 0 to 2 of the slot n) for the RIS reflective pattern information. The RIS controller 200 may control the reflective pattern of the RIS 220 based on the received RIS reflective pattern information so that UE 1 260 may receive the PDCCH transmitted by the BS in symbols 0 to 2 of the slot n.

In an embodiment, in a case that the BS 240 transmits a channel state information reference signal (CSI-RS) to UE 2 270 in symbol 3 of the slot n, the BS 240 may transmit, to the RIS controller 200, the RIS control signal 210 including RIS reflective pattern information corresponding to the location of UE 2 270 and configuration information (symbol 3 of the slot n) for the RIS reflective pattern information. The RIS controller 200 may control the reflective pattern of the RIS 220 based on the received RIS reflective pattern information so that UE 2 270 may receive the CSI-RS transmitted by the BS 240 in symbol 3 of the slot n.

In an embodiment, in a case that the BS 240 transmits a physical downlink shared channel (PDSCH) to UE 3 280 in symbols 4 to 6 of the slot n, the BS 240 may transmit, to the RIS controller 200, the RIS control signal 210 including RIS reflective pattern information corresponding to the location of UE 3 280 and configuration information (symbols 4 to 6 of the slot n) for the RIS reflective pattern information. The RIS controller 200 may control the reflective pattern of the RIS 220 based on the received RIS reflective pattern information so that UE 3 280 may receive the PDSCH transmitted by the BS 240 in symbols 4 to 6 of the slot n.

In an embodiment, in a case that the BS 240 receives a physical uplink shared channel (PUSCH) from UE 4 290 in symbols 7 to 9 of the slot n, the BS 240 may transmit, to the RIS controller 200, the RIS control signal 210 including RIS reflective pattern information corresponding to the location of UE 4 290 and configuration information (symbols 7 to 9 of the slot n) for the RIS reflective pattern information. The RIS controller 200 may control the reflective pattern of the RIS 220 based on the received RIS reflective pattern information so that the BS 240 may receive the PUSCH transmitted by UE 4 290 in symbols 7 to 9 of the slot n.

Figure 3B:
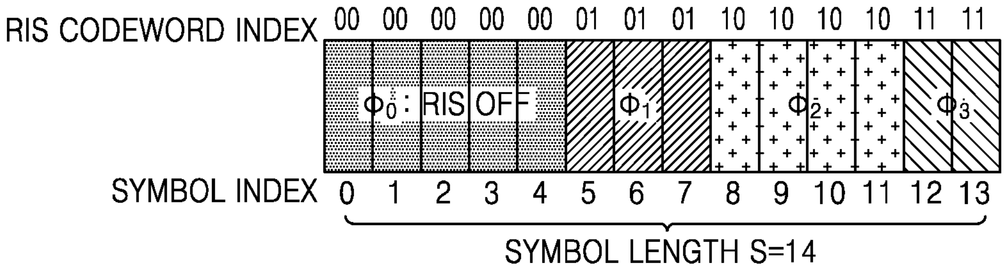
FIG. 3B illustrates an example of an RIS control signal, according to an embodiment of the disclosure.

FIGS. 3A and 3B illustrate an example of an RIS control signal, according to an embodiment of the disclosure.

In an embodiment, a BS may transmit, to an RIS controller, an RIS control signal in a certain slot. For example, the BS may transmit the RIS control signal to the RIS controller by L1 signaling in the certain slot.

In an embodiment, the RIS control signal may include information about a slot offset, and the RIS controller may control a reflective pattern of the RIS for each symbol based on the received RIS control signal from a slot after the lapse of the slot offset from a reception time of the RIS control signal. For example, when the RIS control signal includes information about slot offset K, K≥0, the RIS controller may control a reflective pattern of the RIS for each symbol of a slot separated by K slots from a slot in which the RIS control signal is received, based on the RIS reflective pattern information.

In an embodiment, when the information about the slot offset is transmitted to the RIS controller by L1 signaling, the RIS controller may set a new slot offset value in each slot. Alternatively, when the information about the slot offset is transmitted to the RIS controller by RRC signaling, the RIS controller may set the same slot offset value until receiving information about a new slot offset It is, however, merely an example, and how the RIS controller sets the slot offset value is not limited thereto.

In an embodiment, the RIS control signal may include information about a RIS codeword index $\phi_m$. When there are M RIS codeword indexes, the RIS codeword index $\phi_m$ may be represented as a bitstream in a size of $\lceil \log_2 M \rceil$ bits. For example, when M is 8, the RIS codeword index may be represented as a bitstream in a size of 3 bits as follows:

$$[\Phi_0\ \Phi_1\ \Phi_2\ \Phi_3\ \Phi_4\ \Phi_5\ \Phi_6\ \Phi_7] = [000\ 001\ 010\ 011\ 100\ 101\ 110\ 111]$$

In this case, the RIS codeword index may include an RIS off operation (an occasion when the RIS is not operating), which may be defined by all bits being 0, $\phi_0$.

In an embodiment, the RIS control signal may include information about a RIS codeword index to be applied to an arbitrary symbol. For example, when symbol length of a slot is S, an RIS codeword index to be applied to symbol s+1 may be defined as a bitstream as follows:

$$b_0^{(s)} b_1^{(s)} \ldots b_{\lceil \log_2 M \rceil - 1}^{(s)},\ s = 0, 1, \ldots, S-1$$

Referring to FIGS. 3A and 3B, shown is an RIS codeword index corresponding to each of 14 symbols in the slot in a case that the symbol length S is 14 and there are 4 RIS codeword indexes. In an embodiment, an RIS codeword index to be applied to symbol s+1 may be represented as follows:

$$b_0^{(s)} b_1^{(s)},\ s = 0, 1, \ldots, 13$$

For example, when RIS codeword index $\phi_0$ corresponds to first symbol s=0 to fifth symbol s=4, $$b_0^{(0)} b_1^{(0)}, \ldots, b_0^{(4)} b_1^{(4)}$$

may all be defined as 00. When RIS codeword index $\phi_1$ corresponds to sixth symbol s=5 to eighth symbol s=7, $$b_0^{(5)} b_1^{(5)}, \ldots, b_0^{(7)} b_1^{(7)}$$

may all be defined as 01. When RIS codeword index $\phi_2$ corresponds to ninth symbol s=8 to twelfth symbol s=11, $$b_0^{(8)} b_1^{(8)}, \ldots, b_0^{(11)} b_1^{(11)}$$

may all be defined as 10. When RIS codeword index $\phi_3$ corresponds to thirteenth symbol s=12 to fourteenth symbol s=13, $$b_0^{(12)} b_1^{(12)}, b_0^{(13)} b_1^{(13)}$$

may all be defined as 11.

In an embodiment, the RIS control signal may include information about a transfer mode flag, and depending on the transfer mode, symbol information to which the RIS codeword index is to be applied may be represented in a different manner. For example, when the information about the transfer mode flag indicates transfer mode 0, each symbol is allocated an RIS codeword index. When the information about the transfer mode flag indicates transfer mode 1, an RIS codeword index may be allocated to be applied for a certain symbol length. It is, however, merely an example, and how to name a transfer mode and how to represent the symbol information corresponding to each transfer mode are not limited thereto.

In the meantime, the information about the transfer mode flag may be transmitted by 1-bit L1 signaling or RRC signaling.

Figure 4:
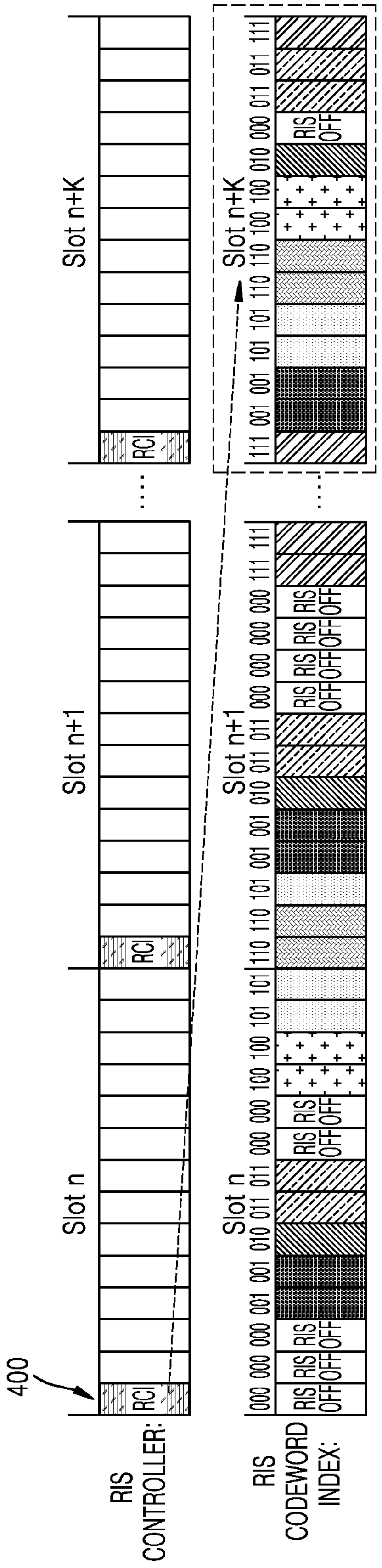
FIG. 4 illustrates an example of an RIS control signal, according to an embodiment of the disclosure.

FIG. 4 illustrates an example of an RIS control signal, according to an embodiment of the disclosure.

In an embodiment, when the information about the transfer mode flag indicates transfer mode 0, the RIS control signal may include information about reflective patterns (or RIS codeword indexes) corresponding to all the symbols in a slot. For example, in a case that symbol length of the slot is S and there are M RIS codeword indexes, the RIS control signal may include an RIS codeword index bitstream in a size of $S \cdot \lceil \log_2 M \rceil$ bits.

$$b_0^{(0)} b_1^{(0)} \ldots b_{\lceil log_2 M \rceil - 1}^{(0)} b_0^{(1)} b_1^{(1)} \ldots b_{\lceil log_2 M \rceil - 1}^{(1)} \ldots b_0^{(S-1)} b_1^{(S-1)} \ldots b_{\lceil log_2 M \rceil - 1}^{(S-1)}$$

Referring to FIG. 4, the RIS controller may receive an RIS control signal 400 in slot n. In an embodiment, the RIS control signal 400 may include transfer mode flag information indicating transfer mode 0 and information about slot offset K. Furthermore, when symbol length S of the slot is 14 and there are 8 RIS codeword indexes, the RIS control signal 400 may include information about a reflective pattern corresponding to each of 14 symbols in the slot as follows:

$$[\Phi_7\ \Phi_1\ \Phi_1\ \Phi_5\ \Phi_5\ \Phi_6\ \Phi_6\ \Phi_4\ \Phi_4\ \Phi_2\ \Phi_0\ \Phi_3\ \Phi_3\ \Phi_7]$$

In this case, the information about the reflective patterns may be represented as an RIS codeword index bitstream corresponding to a size of 42 (=3·14) bits as follows:

$$[111\ 001\ 001\ 101\ 101\ 110\ 110\ 100\ 100\ 010\ 000\ 011\ 011\ 111]$$

In an embodiment, the RIS controller may control a reflective pattern of the RIS for each symbol of slot n+k after the lapse of K slots from the slot n in which the RIS control signal 400 is received, based on the received information about the reflective patterns.

FIGS. 5A to 5E illustrate an example of an RIS control signal, according to an embodiment of the disclosure.

Figure 5A:
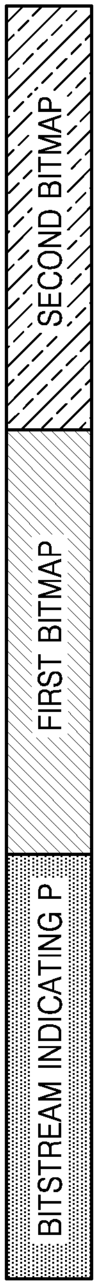
FIG. 5A illustrates an example of an RIS control signal, according to an embodiment of the disclosure.

Referring to FIG. 5A, when the information about the transfer mode flag indicates transfer mode 1, the RIS control signal may include information about a number P of reflective patterns corresponding to an arbitrary slot, information about a set of reflective patterns sequentially corresponding to symbols in the slot, and information about symbols to which each reflective pattern in the reflective pattern set is to be applied. In an embodiment, the information about the number P of reflective patterns may be represented as a bitstream indicating P, the information about the set of reflective patterns sequentially corresponding to symbols in the slot as a first bitmap, and the information about symbols to which each reflective pattern in the reflective pattern set is to be applied as a second bitmap.

In an embodiment, the number P of reflective patterns corresponding to the arbitrary slot has a value between 1 and the symbol length S of the slot, and the RIS controller may identify a border between the first bitmap and the second bitmap based on the information about the number P of reflective patterns. Furthermore, the information about the number P of reflective patterns may be represented as a bitstream in a size of $\lceil \log_2 S \rceil$ bits as follows:

$$[r_0 r_1 \ldots r_{\lceil log_2 S \rceil - 1}]$$

In an embodiment, the information about the set of reflective patterns sequentially corresponding to the symbols in the slot may be represented as a set of P RIS codeword indexes among M RIS codeword indexes. For example, the information about the set of reflective patterns sequentially corresponding to the symbols in the slot may be represented as a bitstream (the first bitmap) in a size of $P \cdot \lceil \log_2 M \rceil$ bits as follows:

$$[b_0^{(0)} b_1^{(0)} \ldots b_{\lceil \log_2 M \rceil - 1}^{(0)} b_0^{(1)} b_1^{(1)} \ldots b_{\lceil \log_2 M \rceil - 1}^{(1)} \ldots b_0^{(P-1)} b_1^{(P-1)} \ldots b_{\lceil \log_2 M \rceil - 1}^{(P-1)}] = [\Phi^{(0)} \Phi^{(1)} \ldots \Phi^{(P-1)}]$$

Bitstream $\phi^{(p)}$ is a bitstream in a size of $\lceil \log_2 M \rceil$ bits to be applied to the (p+1)-th, and indicates a value of one of the M RIS codeword indexes. In this case, each bitstream $\phi^{(p)}$ may have the same value with different streams, but neighboring bitstreams do not have the same value.

In an embodiment, the information about symbols to which each reflective pattern in the reflective pattern set is to be applied may include information about a starting symbol corresponding to each reflective pattern in the reflective pattern set or information about symbol length corresponding to each reflective pattern in the reflective pattern set. In this case, the starting symbol may indicate the foremost symbol among one or more neighboring symbols corresponding to the same reflective pattern, and the symbol length may indicate the number of the one or more neighboring symbols corresponding to the same reflective pattern.

In an embodiment, when the information about symbols to which each reflective pattern in the reflective pattern set is to be applied includes the information about the starting symbol corresponding to each reflective pattern in the reflective pattern set, the information about the starting symbol may be represented by allocating 1 to a bit corresponding to the starting symbol. For example, when the symbol length of the slot is S, the information about the starting symbol corresponding to each reflective pattern in the reflective pattern set may be represented as a bitstream (the second bitmap) in an S bit size as follows:

$$a^{(0)} a^{(1)} \ldots a^{(s-1)}$$

$$a^{(s)} = \begin{cases} 1, & \text{if } s = \text{Index of starting symbol} \\ 0, & \text{otherwise} \end{cases}$$

In another embodiment, when the information about symbols to which each reflective pattern in the reflective pattern set is to be applied includes the information about the starting symbol corresponding to each reflective pattern in the reflective pattern set, the information about the starting symbol may be represented by expressing the index of the starting symbol in bits. For example, when the symbol length of the slot is S and the number of reflective patterns corresponding to an arbitrary slot is P, the index of a starting symbol corresponding to the (p+1)-th reflective pattern may be represented as a bitstream in a size of $\lceil \log_2 S \rceil$ bits as follows:

$$a_0^{(p)} a_1^{(p)} \ldots a_{\lceil \log_2 S \rceil - 1}^{(p)} \text{ for } p = 0, 1, \ldots P-1$$

Accordingly, the information about the starting symbol corresponding to each reflective pattern in the reflective pattern set may be represented as a bitstream (the second bitmap) in a size of $P \cdot \lceil \log_2 S \rceil$ bits as follows:

$$[a_0^{(0)} a_1^{(0)} \ldots a_{\lceil log_2 S \rceil - 1}^{(0)} a_0^{(1)} a_1^{(1)} \ldots a_{\lceil log_2 S \rceil - 1}^{(1)} \ldots a_0^{(P-1)} a_1^{(P-1)} \ldots a_{\lceil log_2 S \rceil - 1}^{(P-1)}]$$

FIG. 5D illustrates bitstreams corresponding to indexes of starting symbols in a case that the symbol length S of the slot is 14, according to an embodiment of the disclosure. For example, when an index of a starting symbol is 4, the index of the starting symbol may be represented as 0100. When an index of a starting symbol is 10, the index of the starting symbol may be represented as 1010.

In an embodiment, when the information about symbols to which each reflective patterns in the reflective pattern set is to be applied includes the information about the symbol length corresponding to each reflective pattern in the reflective pattern set, the information about the symbol length may represent a value of the symbol length in bits. For example, when the symbol length of the slot is S and the number of reflective patterns corresponding to an arbitrary slot is P, the value of the symbol length corresponding to the (p+1)-th reflective pattern may be represented as a bitstream in a size of $\lceil \log_2 S \rceil$ bits as follows:

$$a_0^{(p)} a_1^{(p)} \ldots a_{\lceil \log_2 S \rceil - 1}^{(p)} \text{ for } p = 0, 1, \ldots P-1$$

Accordingly, the information about the symbol length corresponding to each reflective pattern in the reflective pattern set may be represented as a bitstream (the second bitmap) in a size of $P \cdot \lceil \log_2 S \rceil$ bits as follows:

$$[a_0^{(0)} a_1^{(0)} \ldots a_{\lceil log_2 S \rceil - 1}^{(0)} a_0^{(1)} a_1^{(1)} \ldots a_{\lceil log_2 S \rceil - 1}^{(1)} \ldots a_0^{(P-1)} a_1^{(P-1)} \ldots a_{\lceil log_2 S \rceil - 1}^{(P-1)}]$$

FIG. 5E illustrates bitstreams corresponding to indexes of starting symbols in a case that the symbol length S of the slot is 14, according to an embodiment of the disclosure. For example, when a value of a symbol length is 4, the value of the symbol length may be represented as 0011. When a value of a symbol length is 10, the value of the symbol length may be represented as 1001.

Figure 5B:
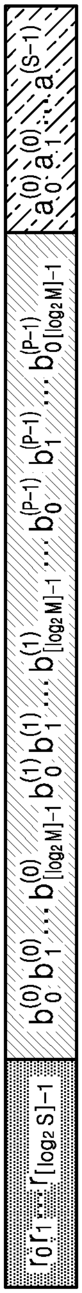
FIG. 5B illustrates an example of an RIS control signal, according to an embodiment of the disclosure.

FIG. 5B illustrates a bitstream included in an RIS control signal in a case that the RIS control signal includes information about a starting symbol corresponding to each reflective pattern in the reflective pattern set and a bit corresponding to the starting symbol is allocated '1', according to an embodiment. In this case, the length of the bitstream that, indicates P may be $\lceil \log_2 S \rceil$, the length of the first bitmap may be $P \cdot \lceil \log_2 M \rceil$, and the length of the second bitmap may be S. Accordingly, total length of the bitstream included in the RIS control signal may be as follows:

$$\lceil \log_2 S \rceil + P \cdot \lceil \log_2 M \rceil + S$$

Figure 5C:
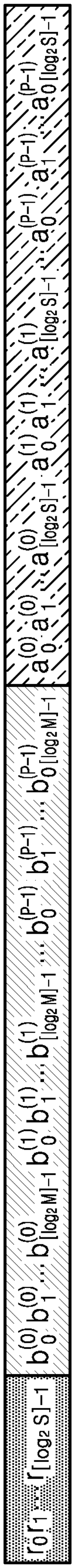
FIG. 5C illustrates an example of an RIS control signal, according to an embodiment of the disclosure.

FIG. 5C illustrates a bitstream included in the RIS control signal in a case that the RIS control signal includes information about a starting symbol corresponding to each reflective pattern in the reflective pattern set and an index of the starting symbol is represented in bits or in a case that the RIS control signal includes information about symbol length corresponding to each reflective pattern in the reflective pattern set and a value of the symbol length is represented in bits. In this case, the length of the bitstream that indicates P may be $\lceil \log_2 S \rceil$, the length of the first bitmap may be $P \cdot \lceil \log_2 M \rceil$, and the length of the second bitmap may be $P \cdot \lceil \log_2 S \rceil$. Accordingly, total length of the bitstream included in the RIS control signal may be as follows:

$$\lceil \log_2 S \rceil + P \cdot \lceil \log_2 M \rceil + P \cdot \lceil \log_2 S \rceil$$

Hence, in a case of $S < P \cdot \lceil \log_2 S \rceil$, with the RIS control signal including information about a starting symbol corresponding to each reflective pattern in the reflective pattern set and a bit corresponding to the starting symbol being allocated '1', signaling overhead may be reduced.

In an embodiment, when information about a transfer mode flag indicates transfer mode 1, the BS may transmit information about how to represent the second bitmap to the RIS controller. For example, the BS may transmit the information about how to represent the second bitmap to the RIS controller in 2-bit L1 signaling or RRC signaling. However, when the method of representing the second bitmap is selected in advance and used, the BS may not transmit the information about how to represent the second bitmap to the RIS controller.

In an embodiment, when the BS fails to transmit the RIS control signal, the RIS controller may control the reflective patterns of the RIS based on a default RIS codeword index. The default RIS codeword index may indicate $\phi_0$ (RIS off operation) or an RIS codeword index right before the BS fails transmission of the RIS control signal, and the RIS controller may choose it by considering various scheduling environments.

FIGS. 6A to 6E illustrate a method of designing an RIS control signal, according to an embodiment of the disclosure.

Figure 6A:
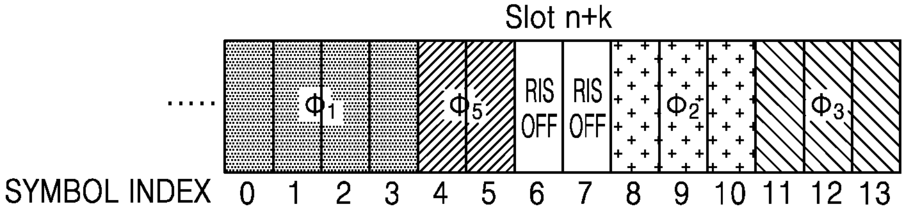
FIG. 6A illustrates a method of designing an RIS control signal, according to an embodiment of the disclosure.

FIG. 6A illustrates an example of a reflective pattern or an RIS codeword index corresponding to each symbol in slot n+K. In an embodiment, symbol length S of the slot may be 14, and the number M of RIS codewords indexes may be 8.

Referring to FIG. 6A, RIS codeword index $\phi_1$ may correspond to symbols 0 to 3, and RIS codeword index $\phi_5$ may correspond to symbols 4 and 5. Furthermore, the RIS may not operate in symbols 6 and 7. (I.e., RIS codewords index $\phi_0$ may correspond to symbols 6 and 7.) RIS codeword index $\phi_2$ may correspond to symbols 8 to 10, and RIS codeword index $\phi_3$ may correspond to symbols 11 and 13.

FIG. 6B illustrates an example of a bitstream corresponding to the reflective patterns as shown in FIG. 6A in a case that information about the transmission mode flag indicates transfer mode 0. In an embodiment, as the information about the transfer mode flag indicates transfer mode 0, the RIS control signal may include information about a reflective pattern (or an RIS codeword index) corresponding to each symbol in the slot. Accordingly, the RIS control signal may include a bitstream in a size of 42 ($=14 \cdot \lceil \log_2 8 \rceil$) bits as follows:

[001001101101000000010010010011011011]

Figure 6C:
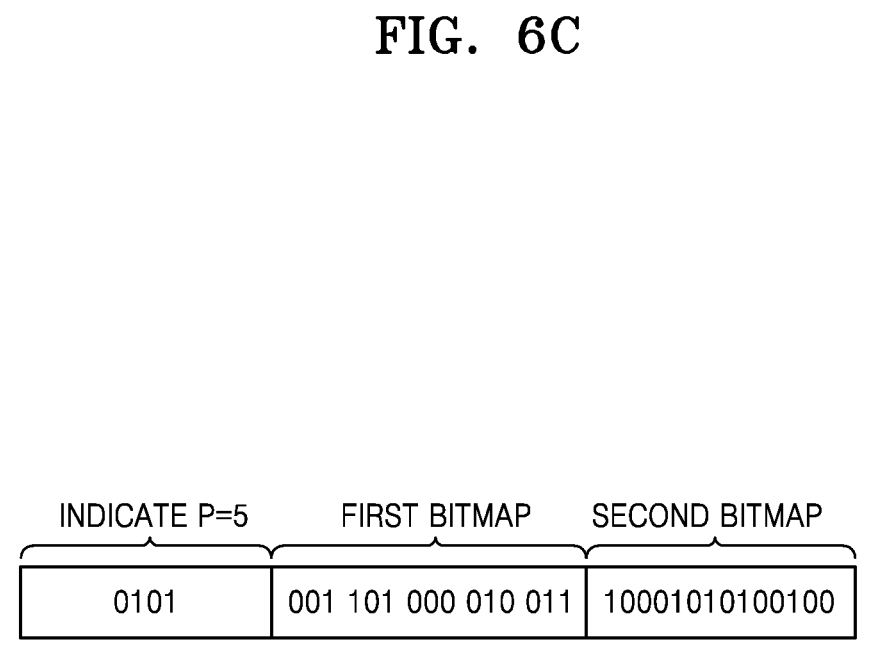

FIG. 6C illustrates an example of a bitstream corresponding to the reflective patterns as shown in FIG. 6A in a case that information about the transmission mode flag indicates transfer mode 1. In an embodiment, the RIS control signal may include information about a number P of reflective patterns corresponding to an arbitrary slot, information about a set of reflective patterns sequentially corresponding to symbols in the slot, and information about a starting symbol corresponding to each reflective pattern in the reflective pattern set. Furthermore, the information about the starting symbol may be represented by allocating '1' to a bit corresponding to the starting symbol.

Referring to FIG. 6A, as 5 reflective patterns or RIS codeword indexes ($\phi_1 \rightarrow \phi_5 \rightarrow \phi_0 \rightarrow \phi_2 \rightarrow \phi_3$) are applied to slot n+K, the number P of the reflective patterns is 5 and a bitstream that represents P is 0101. Furthermore, as indexes of starting symbols corresponding to the respective 5 RIS codeword indexes are {0, 4, 6, 8, 11}, the second bitmap may be represented as [10001010100100] by allocating 1s to bits (first, fifth, seventh, ninth and twelfth bits) corresponding to the starting symbols. Accordingly, the RIS control signal may include a bitstream in a size of 33($=\lceil \log_2 14 \rceil + 5 \cdot \lceil \log_2 8 \rceil + 14 = 4 + 15 + 14$) bits as follows:

[0101 001101000010011 10001010100100]

Figure 6D:
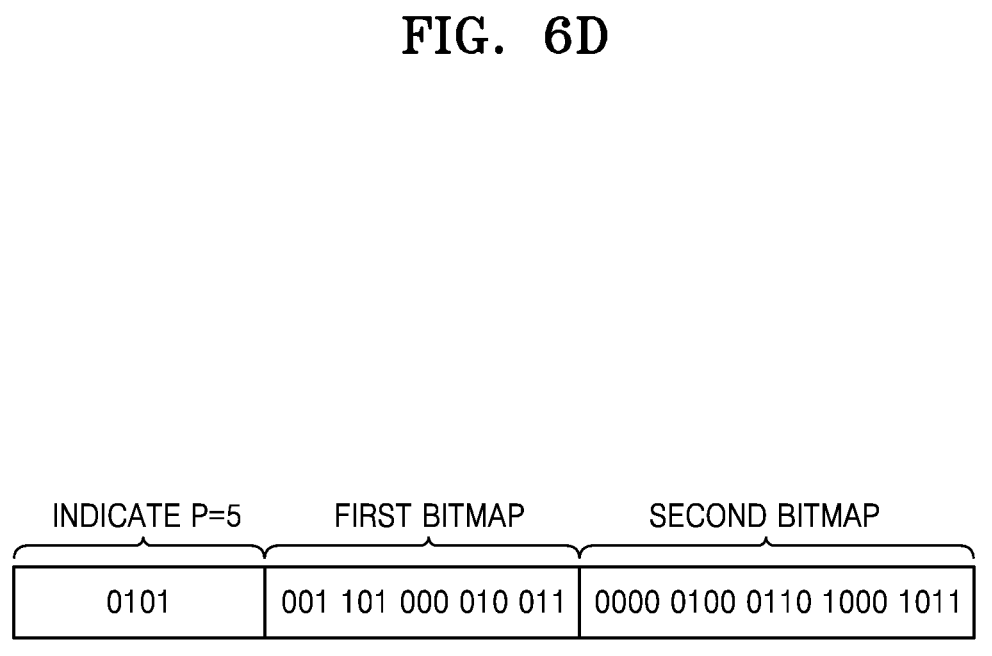

FIG. 6D illustrates an example of a bitstream corresponding to the reflective patterns as shown in FIG. 6A in a case that information about the transmission mode flag indicates transfer mode 1. In an embodiment, the RIS control signal may include information about a number P of reflective patterns corresponding to an arbitrary slot, information about a set of reflective patterns sequentially corresponding to symbols in the slot, and information about a starting symbol corresponding to each reflective pattern in the reflective pattern set. Furthermore, the information about the starting symbol may be represented by indicating the index of the starting symbol in bits.

As described above, as 5 reflective patterns or RIS codeword indexes ($\phi_1 \rightarrow \phi_5 \rightarrow \phi_0 \rightarrow \phi_2 \rightarrow \phi_3$) are applied to slot n+K, the number P of the reflective patterns is 5 and a bitstream that represents P is 0101. Furthermore, as indexes of the starting symbols corresponding to the respective 5 RIS codeword indexes are {0, 4, 6, 8, 11}, the second bitmap may be represented as [00000100011010001011] by expressing the indexes of the starting symbols in bits. (Refer to FG. 5D) Accordingly, the RIS control signal may include a bitstream in a size of 39($=\lceil \log_2 14 \rceil + 5 \cdot \lceil \log_2 8 \rceil + 5 \cdot \lceil \log_2 14 \rceil = 4 + 15 + 20$) bits as follows:

[0101 001101000010011 00000100011010001011]

Figure 6E:
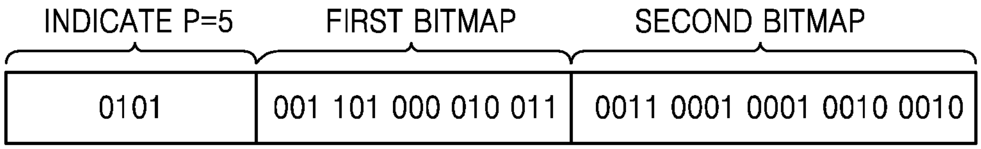
FIG. 6E illustrates a method of designing an RIS control signal, according to an embodiment of the disclosure.

FIG. 6E illustrates an example of a bitstream corresponding to the reflective patterns as shown in FIG. 6A in a case that information about the transmission mode flag indicates transfer mode 1. In an embodiment, the RIS control signal may include information about the number P of reflective patterns corresponding to an arbitrary slot, information about a set of reflective patterns sequentially corresponding to symbols in the slot, and information about symbol length corresponding to each reflective pattern in the reflective pattern set. Furthermore, the information about the symbol length may be represented by indicating a value of the symbol length in bits.

As described above, as 5 reflective patterns or RIS codeword indexes ($\phi_1 \rightarrow \phi_5 \rightarrow \phi_0 \rightarrow \phi_2 \rightarrow \phi_3$) are applied to slot n+K, the number P of the reflective patterns is 5 and a bitstream that represents P may be 0101. Furthermore, as values of the symbol length corresponding to the respective 5 RIS codeword indexes are {4, 2, 2, 3, 3}, the second bitmap may be represented as [00110001000100100010] by expressing the values of the symbol length in bits. (Refer to FG. 5E) Accordingly, the RIS control signal may include a bitstream in a size of 39($=\lceil \log_2 14 \rceil + 5 \cdot \lceil \log_2 8 \rceil + 5 \cdot \lceil \log_2 14 \rceil = 4+15+20$) bits as follows:

[0101 001101000010011 00110001000100100010]

In the meantime, referring to FIGS. 6A to 6E, in a case that the bitstream corresponding to the reflective patterns of the RIS is represented based on transfer mode 1, it may be represented in a smaller number of bits than in the case of being represented based on transfer mode 0. Furthermore, when the RIS control signal includes information about a starting symbol corresponding to each reflective pattern in the reflective pattern set and '1' is allocated to a bit corresponding to a starting symbol, the bitstream corresponding to the reflective patterns of the RIS may be represented in a smaller number of bits than in a case that the RIS control signal includes information about a starting symbol corresponding to each reflective pattern in the reflective pattern set and the index of the starting symbol is represented in bits and than in a case that the RIS control signal includes information about symbol length corresponding to each reflective pattern in the reflective pattern set and a value of the symbol length is represented in bits.

FIGS. 7A to 7E illustrate a method of designing an RIS control signal, according to an embodiment of the disclosure.

Figure 7A:
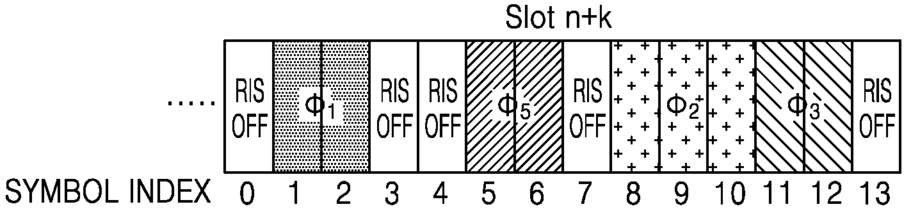
FIG. 7A illustrates a method of designing an RIS control signal, according to an embodiment of the disclosure.

FIG. 7A illustrates an example of a reflective pattern or an RIS codeword index corresponding to each symbol in slot n+K. In this case, symbol length S of the slot may be 14, and the number M of RIS codewords indexes may be 8.

Referring to FIG. 7A, the RIS may not operate in symbols 0, 3, 4, 7 and 13. (I.e., RIS codewords index $\phi_0$ may correspond to symbols 0, 3, 4, 7 and 13.) RIS codeword index $\phi_1$ may correspond to symbols 1 and 2, and RIS codeword index $\phi_5$ may correspond to symbols 5 and 6. Furthermore, RIS codeword index $\phi_2$ may correspond to symbols 8 to 10, and RIS codeword index $\phi_3$ may correspond to symbols 11 and 12.

FIG. 7B illustrates an example of a bitstream corresponding to the reflective patterns as shown in FIG. 7A in a case that information about the transmission mode flag indicates transfer mode 0. In an embodiment, as the information about the transfer mode flag indicates transfer mode 0, the RIS control signal may include information about a reflective pattern or information about an RIS codeword index corresponding to each symbol in the slot. Accordingly, the RIS control signal may include a bitstream in a size of 42($=14 \cdot \lceil \log_2 8 \rceil$) bits as follows:

[001001001001101101000000001001001001101 1011]

Figure 7C:
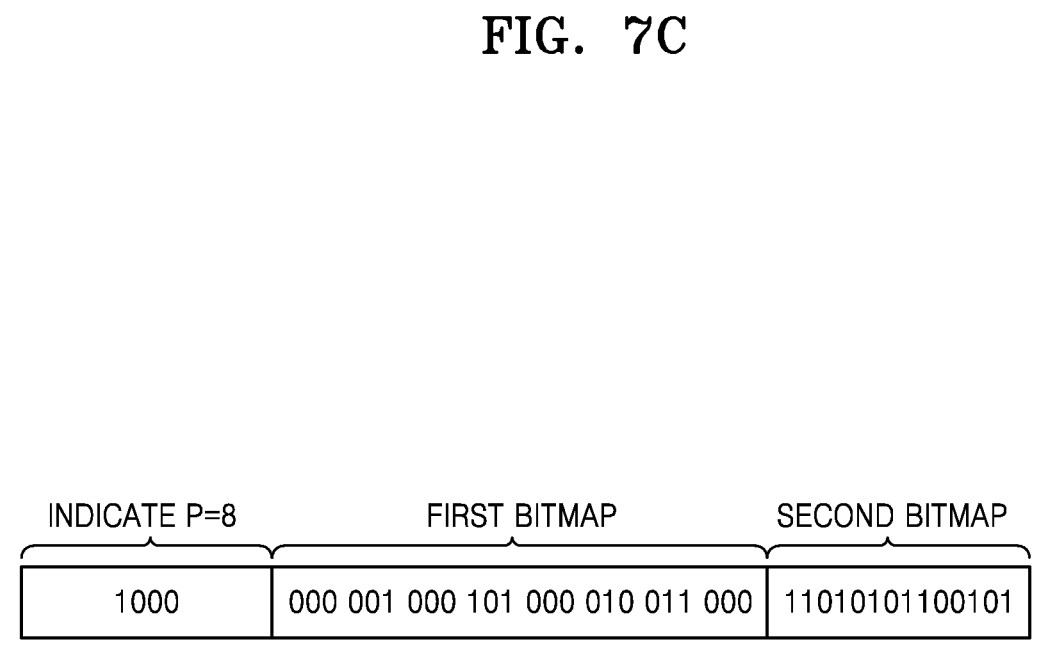

FIG. 7C illustrates an example of a bitstream corresponding to the reflective patterns as shown in FIG. 7A in a case that information about the transmission mode flag indicates transfer mode 1. In an embodiment, the RIS control signal may include information about the number P of reflective patterns corresponding to an arbitrary slot, information about a set of reflective patterns sequentially corresponding to symbols in the slot, and information about a starting symbol corresponding to each reflective pattern in the reflective pattern set. Furthermore, the information about the starting symbol may be represented by allocating '1' to a bit corresponding to the starting symbol.

Referring to FIG. 7A, as 8 reflective patterns or RIS codeword indexes $\phi_0 \rightarrow \phi_1 \rightarrow \phi_0 \rightarrow \phi_5 \rightarrow \phi_0 \rightarrow \phi_2 \rightarrow \phi_3 \rightarrow \phi_0$ are applied to slot n+K, the number P of the reflective patterns is 8 and a bitstream that represents P may be 1000. Furthermore, as indexes of starting symbols corresponding to the respective 8 RIS codeword indexes are {0, 1, 3, 5, 7, 8, 11, 13}, the second bitmap may be represented as [11010101100101] by allocating 1s to bits (first, second, fourth, sixth, eighth, ninth, twelfth and fourteenth bits) corresponding to the starting symbols. Accordingly, the RIS control signal may include a bitstream in a size of 42($=\lceil \log_2 14 \rceil + 8 \cdot \lceil \log_2 8 \rceil + 14 = 4+24+14$) bits as follows:

[1000 000001000101000010011000 11010101100101]

Figure 7D:
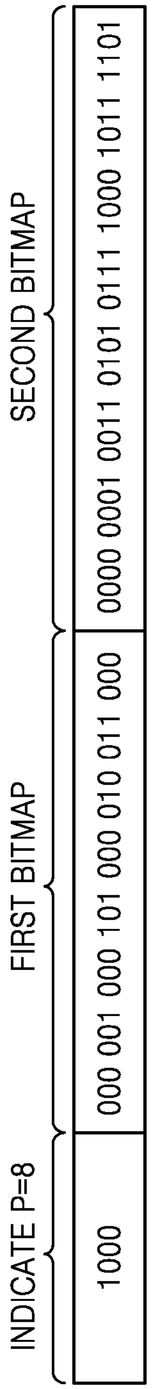
FIG. 7D illustrates a method of designing an RIS control signal, according to an embodiment of the disclosure.

FIG. 7D illustrates an example of a bitstream corresponding to the reflective patterns as shown in FIG. 7A in a case that information about the transmission mode flag indicates transfer mode 1. In an embodiment, the RIS control signal may include information about the number P of reflective patterns corresponding to an arbitrary slot, information about a set of reflective patterns sequentially corresponding to symbols in the slot, and information about a starting symbol corresponding to each reflective pattern in the reflective pattern set. Furthermore, the information about the starting symbol may be represented by indicating the index of the starting symbol in bits.

As described above, as 8 reflective patterns or RIS codeword indexes $\phi_0 \rightarrow \phi_1 \rightarrow \phi_0 \rightarrow \phi_5 \rightarrow \phi_0 \phi \rightarrow_2 \rightarrow \phi_3 \rightarrow \phi_0$ are applied to slot n+K, the number P of the reflective patterns is 8 and a bitstream that represents P is 1000. Furthermore, as indexes of the starting symbols corresponding to the respective 8 RIS codeword indexes are {0, 1, 3, 5, 7, 8, 11, 13}, the second bitmap may be represented as [00000001001101010111100010111101] by expressing the indexes of the starting symbols in bits. (Refer to FG. 5D) Accordingly, the RIS control signal may include a bitstream in a size of 60($=\lceil \log_2 14 \rceil + 8 \cdot \lceil \log_2 8 \rceil + 8 \cdot \lceil \log_2 14 \rceil = 4+24+32$) bits as follows:

[1000 000001000101000010011000 00000001001101010111100010111101]

Figure 7E:
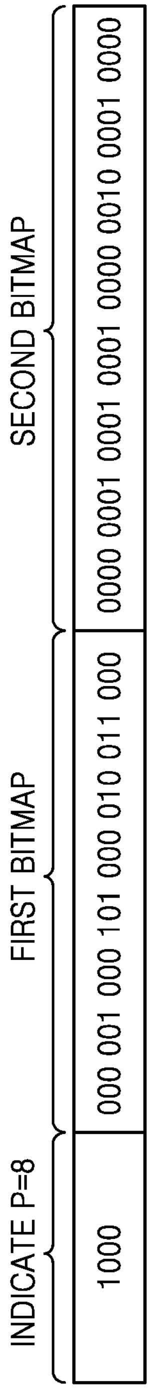
FIG. 7E illustrates a method of designing an RIS control signal, according to an embodiment of the disclosure.

FIG. 7E illustrates an example of a bitstream corresponding to the reflective patterns as shown in FIG. 7A in a case that information about the transmission mode flag indicates transfer mode 1. In an embodiment, the RIS control signal may include information about the number P of reflective patterns corresponding to an arbitrary slot, information about a set of reflective patterns sequentially corresponding to symbols in the slot, and information about symbol length corresponding to each reflective pattern in the reflective pattern set. Furthermore, the information about the symbol length may be represented by indicating a value of the symbol length in bits.

As described above, as 8 reflective patterns or RIS codeword indexes $\phi_0 \rightarrow \phi_1 \rightarrow \phi_0 \rightarrow \phi_5 \rightarrow \phi_0 \phi \rightarrow_2 \rightarrow \phi_3 \rightarrow \phi_0$ are applied to slot n+K, the number P of the reflective patterns is 8 and a bitstream that represents P may be 1000. Furthermore, as values of the symbol length corresponding to the respective 8 RIS codeword indexes are {1, 2, 2, 2, 1, 3, 2, 1}, the second bitmap may be represented as [00000001000100010000001000010000] by expressing the values of the symbol length in bits. (Refer to FG. 5E) Accordingly, the RIS control signal may include a bitstream in a size of 60(=$\lceil \log_2 14 \rceil + 8 \cdot \lceil \log_2 8 \rceil + 8 \cdot \lceil \log_2 14 \rceil$=4+24+32) bits as follows:

[1000 000001000101000010011000 00000001000100010000001000010000]

In the meantime, referring to FIGS. 7A to 7E, in a case that the bitstream corresponding to the reflective patterns of the RIS is represented based on transfer mode 0, it may be represented in a smaller number of bits than in the case of being represented based on transfer mode 1. Furthermore, when the RIS control signal includes information about a starting symbol corresponding to each reflective pattern in the reflective pattern set and '1' is allocated to a bit corresponding to a starting symbol, the bitstream corresponding to the reflective patterns of the RIS may be represented in a smaller number of bits than in a case that the RIS control signal includes information about a starting symbol corresponding to each reflective pattern in the reflective pattern set and the index of the starting symbol is represented in bits and than in a case that the RIS control signal includes information about symbol length corresponding to each reflective pattern in the reflective pattern set and a value of the symbol length is represented in bits.

Figure 8A:
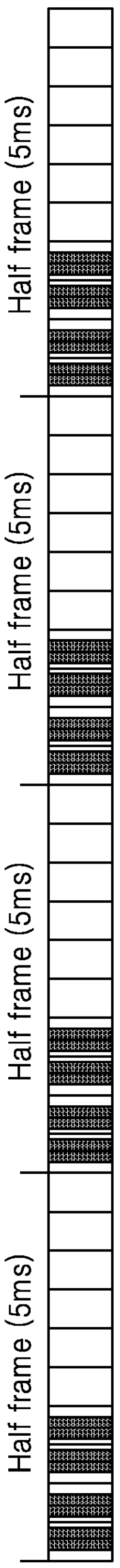
FIG. 8A illustrates an example of an RIS control signal when a base station (BS) transmits a signal in each period, according to an embodiment of the disclosure.
Figure 8B:
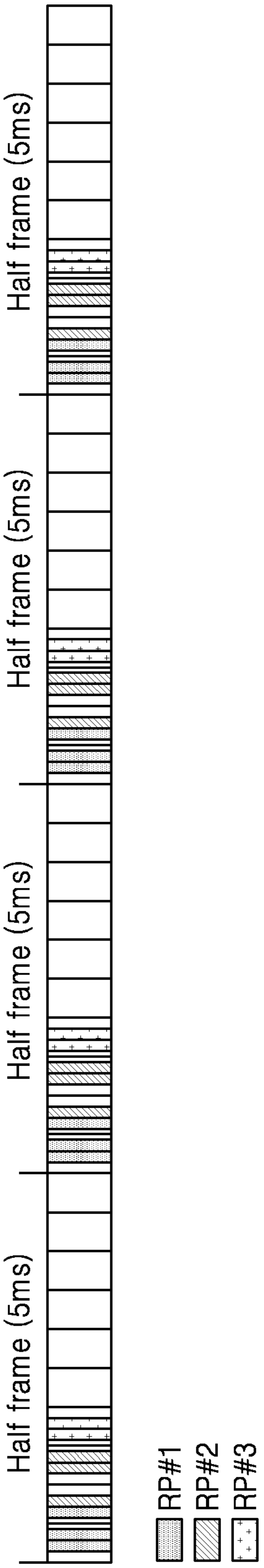
FIG. 8B illustrates an example of an RIS control signal when a BS transmits a signal in each period, according to an embodiment of the disclosure.

FIG. 8A and FIG. 8B illustrate an example of an RIS control signal when a BS transmits a signal in each period, according to an embodiment of the disclosure.

Referring to FIG. 8A, the BS may transmit the same signal to one or more UEs through the RIS at particular intervals. For example, the BS may transmit a sync signal to a UE located in a shaded area at 5 ms (half frame) intervals. In this case, the signal transmitted at particular intervals may be a semi-persistent signal.

Referring to 8B, as the BS transmits the same signal to the UE located in a shaded area through the RIS at particular intervals, the RIS controller may set a reflective pattern of the RIS corresponding to the location of the UE in each period. For example, the reflective pattern of the RIS may be repeated at 5 ms (half frame) intervals.

In an embodiment, when the BS transmits the same signal to the UE located in the shaded area at particular intervals, the BS may transmit, to the RIS controller, an RIS control signal including information about the period and information about the RIS reflective pattern corresponding to each signal repeated in each period. For example, the BS may transmit, to the RIS controller, information about the period and information about the RIS reflective pattern corresponding to each signal by RRC signaling in advance. Accordingly, compared to a case that the BS transmits the RIS control signal to the RIS controller in each slot, signaling overhead may be reduced.

In an embodiment, the RIS controller may set an RIS reflective pattern corresponding to each signal repeated in each period from a particular time for particular duration and repeat the setting in each period based on the received RIS control signal.

It is, however, merely an example, and when the BS transmits the same signal to the UE located in the shaded area through the RIS in each particular period, the BS may transmit the RIS control signal to the RIS controller in each slot by L1 signaling. For example, as described above in connection with FIGS. 4 to 7E, the BS may transmit the RIS control signal including information about RIS reflective patterns corresponding to all symbols in the slot or information about an RIS reflective pattern corresponding to a particular symbol length by L1 signaling in each slot.

FIGS. 9A to 9D illustrate an example of a BS transmitting a signal through an RIS in each period, according to an embodiment of the disclosure.

Figure 9A:
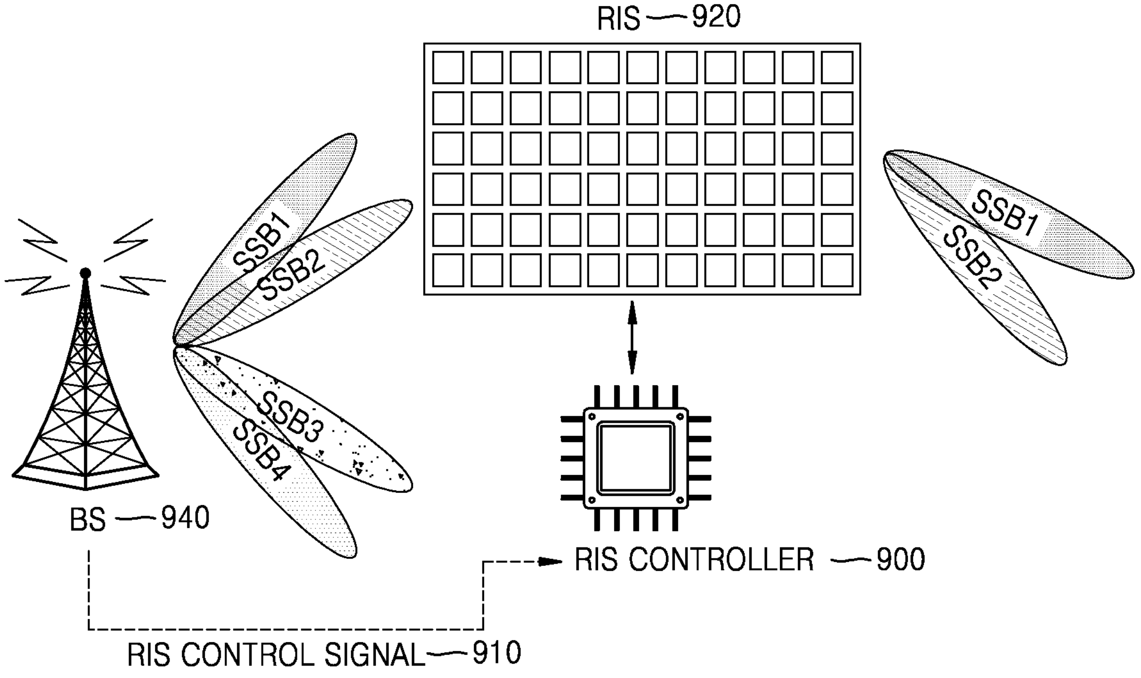
FIG. 9A illustrates an example of a BS transmitting a signal through an RIS in each period, according to an embodiment of the disclosure.

Referring to FIG. 9A, the BS 940 may transmit a signal into a shaded area through an RIS 920 at particular intervals. For example, the BS 940 may transmit SSB1 and SSB2 to the shaded area through the RIS 920 at particular intervals.

Figure 9B:
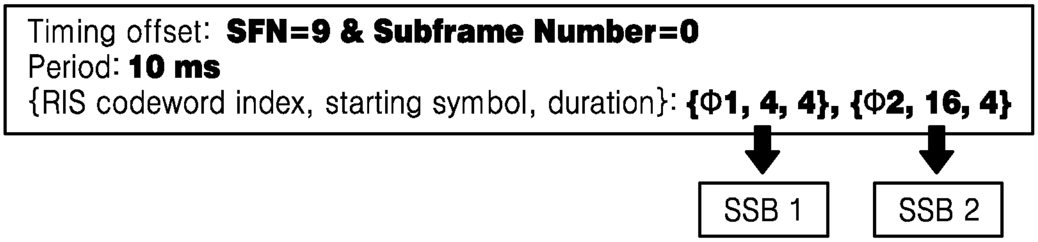
FIG. 9B illustrates an example of a BS transmitting a signal through an RIS in each period, according to an embodiment of the disclosure.
Figure 9C:
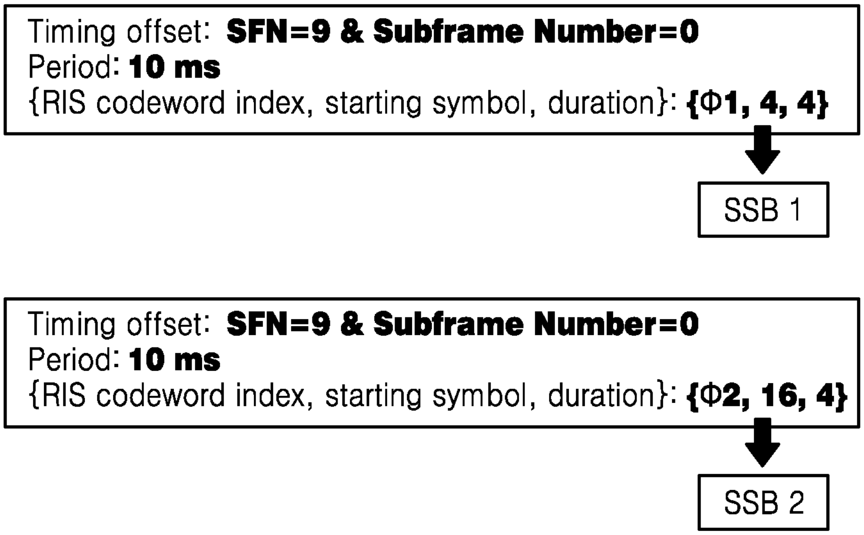
FIG. 9C illustrates an example of a BS transmitting a signal through an RIS in each period, according to an embodiment of the disclosure.

FIGS. 9B and 9C illustrate an example of an RIS control signal 910 transmitted by the BS 940 to an RIS controller 900 in a case that the BS 940 transmits signals through the RIS 920 at particular intervals. In an embodiment, the RIS control signal 910 may include information about an RIS reflective pattern corresponding to each signal transmitted in each period and information about a starting symbol and symbol length corresponding to each RIS reflective pattern. Furthermore, the RIS control signal 910 may include information about a period and information about a time to apply the RIS reflective pattern.

In an embodiment, the information about the period included in the RIS control signal may be represented as a time unit, or represented as the number of slots, the number of frames, or the like. For example, the information about the period may be represented as a time unit such as 10 ms, or represented as 10 slots, 8 frames, or the like.

In an embodiment, the information about the time to apply the RIS reflective pattern included in the RIS control signal 910 may be represented as absolute time information or relative time information. For example, the information about the time to apply the RIS reflective pattern may be represented as accurate information such as system frame number (SFN), subframe number and/or slot number. Alternatively, the information about the time to apply the RIS reflective pattern may be represented as a timing offset $\Delta_t$, allowing the RIS controller 900 to control a reflective pattern of the RIS based on the RIS control signal 910 from after the lapse of $\Delta_t$ from when receiving the RIS control signal 910.

Referring to FIGS. 9B and 9C, the RIS control signal 910 may include information indicating that a period for transmission of SSB1 and SSB2 is 10 ms. Furthermore, the RIS control signal 910 may include information indicating that the RIS reflective pattern is to be repetitively set at 10 ms intervals from a time at which SFN=9 and subframe number=0. The RIS control signal 910 may include {$\phi_1$, 4, 4} and {$\phi_2$, 16, 4} that indicate information about {RIS codeword index, starting symbol, symbol length} corresponding to SSB1 and SSB2, respectively.

In an embodiment, the RIS control signal 910 may be transmitted in one or more RRC messages. For example, as shown in FIG. 9B, information about {RIS codeword index, starting symbol, symbol length} corresponding to the respective SSB1 and SSB2 may be transmitted in one RRC message. Alternatively, as shown in FIG. 9C, information about {RIS codeword index, starting symbol, symbol length} corresponding to the respective SSB1 and SSB2 may be transmitted in different RRC messages. It is, however, merely an example, and the RIS control signal 910 may be transmitted in a manner different from what is described above.

Figure 9D:
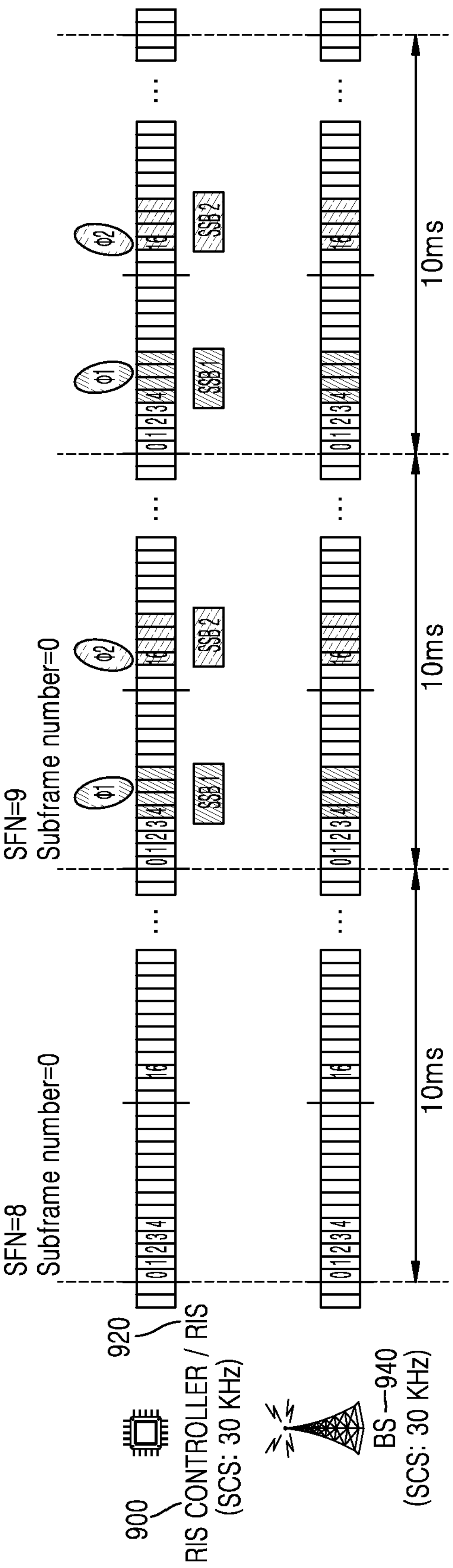
FIG. 9D illustrates an example of a BS transmitting a signal through an RIS in each period, according to an embodiment of the disclosure.

Referring to FIG. 9D, the RIS controller 900 may set an RIS reflective pattern corresponding to each signal repeated in each period from a particular time for particular duration and repeat this in each period based on the received RIS control signal 910. For example, the RIS controller 900 may control a reflective pattern of the RIS 920 according to RIS codeword index $\phi_1$ corresponding to SSB1 during symbols 4 to 7 at 10 ms intervals from when SFN=9 and subframe number=0. Furthermore, the RIS controller 900 may control a reflective pattern of the RIS 920 according to RIS codeword index (corresponding to SSB2 during symbols 16 to 19 at 10 ms intervals from when SFN=9 and subframe number=0.

Figure 10A:
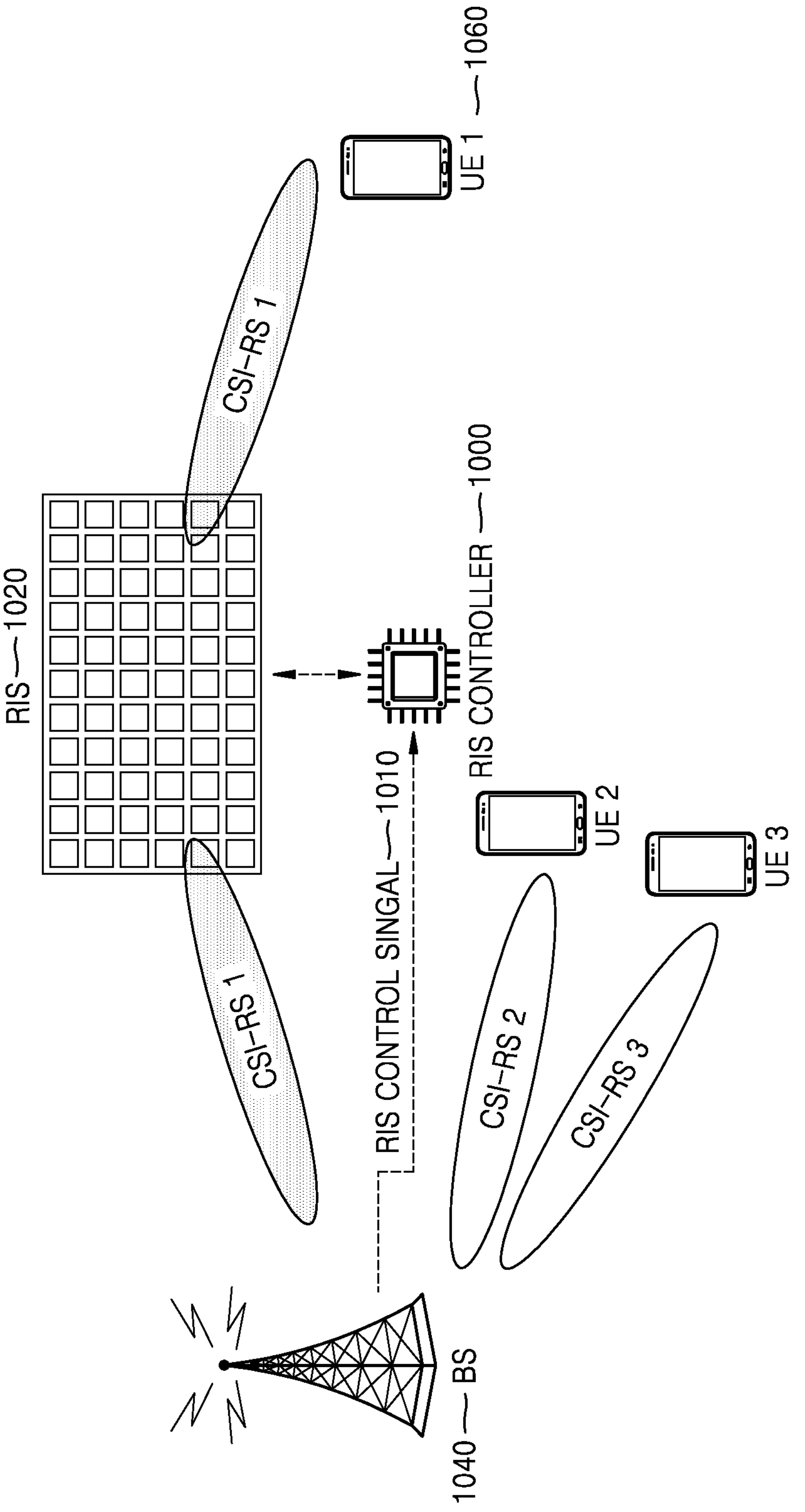
FIG. 10A illustrates an example of a BS transmitting a signal through an RIS in each period, according to an embodiment of the disclosure.
Figure 10B:
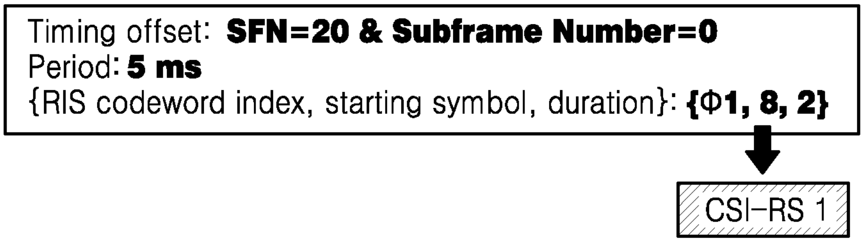
FIG. 10B illustrates an example of a BS transmitting a signal through an RIS in each period, according to an embodiment of the disclosure.
Figure 10C:
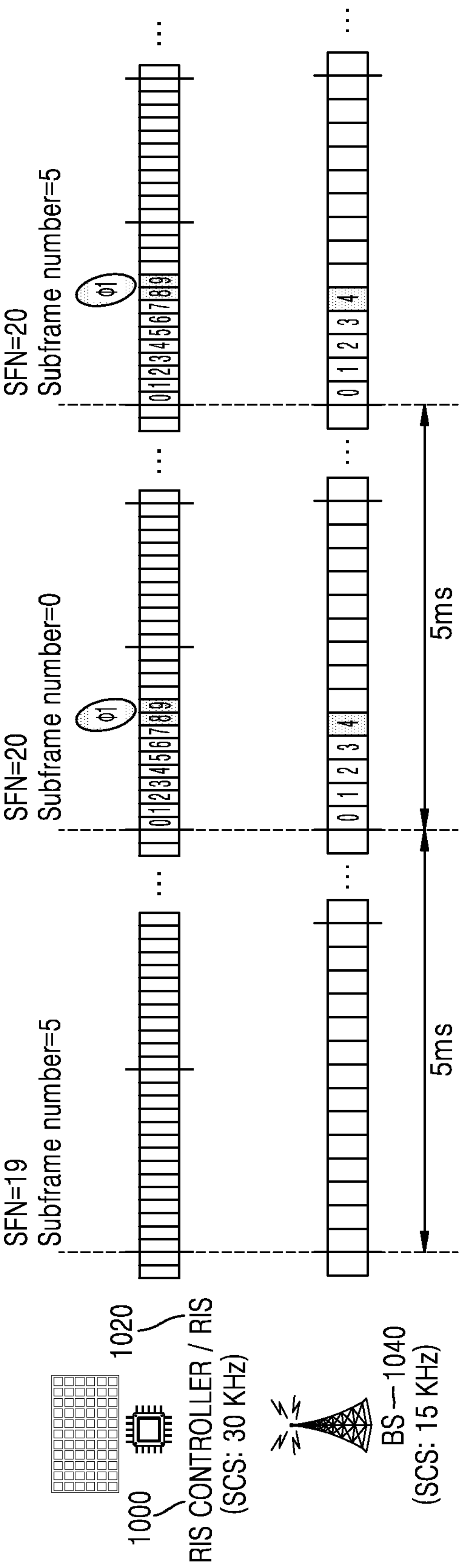
FIG. 10C illustrates an example of a BS transmitting a signal through an RIS in each period, according to an embodiment of the disclosure.

FIGS. 10A to 10C illustrate an example of a BS transmitting a signal through an RIS in each period, according to an embodiment of the disclosure. Contents overlapping FIGS. 9A to 9D will be omitted or described briefly.

Referring to FIG. 10A, a BS 1040 may transmit a signal to one or more UEs 1060 through an RIS 1020 at particular intervals. For example, the BS 1040 may transmit a CSI-RS through the RIS 1020 at particular intervals.

Referring to FIG. 10B, an RIS control signal 1010 may include information indicating that a period for transmission of the CSI-RS is 5 ms. Furthermore, the RIS control signal 1010 may include information indicating that the RIS reflective pattern is to be repetitively set at 5 ms intervals from a time at which SFN=20 and subframe number=0. The RIS control signal 1010 may include $\{\phi_1, 8, 2\}$ that indicates information about {RIS codeword index, starting symbol, symbol length} corresponding to the CSI-RS.

Referring to FIG. 10C, an RIS controller 1000 may set an RIS reflective pattern corresponding to each signal repeated in each period from a particular time for particular duration and repeat this in each period based on the received RIS control signal 1010. For example, the RIS controller 1000 may control a reflective pattern of the RIS 1020 according to RIS codeword index $\phi_1$ corresponding to the CSI-RS during symbols 8 and 9 at 5 ms intervals from when SFN=20 and subframe number=0.

In an embodiment, subcarrier spacing set by each of the RIS controller and the BS may be the same or different from the other. For example, as shown in FIG. 9D, the RIS controller 900 and the BS 940 may set the same subcarrier spacing of 30 kHz. Alternatively, as shown in FIG. 10C, the RIS controller 1000 and the BS 1040 may set different subcarrier spacing of 30 kHz and 15 kHz, respectively.

FIGS. 11A to 11H illustrate an example of a BS transmitting a cell-specific signal through an RIS in each period, according to an embodiment of the disclosure.

Figure 11A:
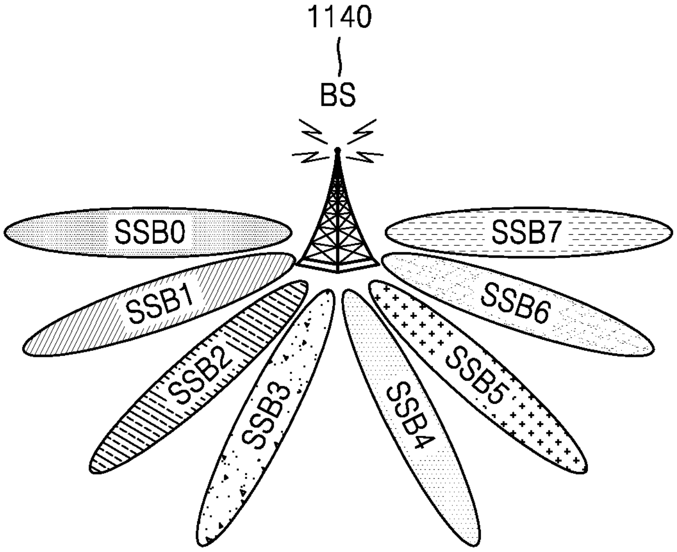
FIG. 11A illustrates an example of a BS transmitting a cell-specific signal through an RIS in each period, according to an embodiment of the disclosure.
Figure 11B:
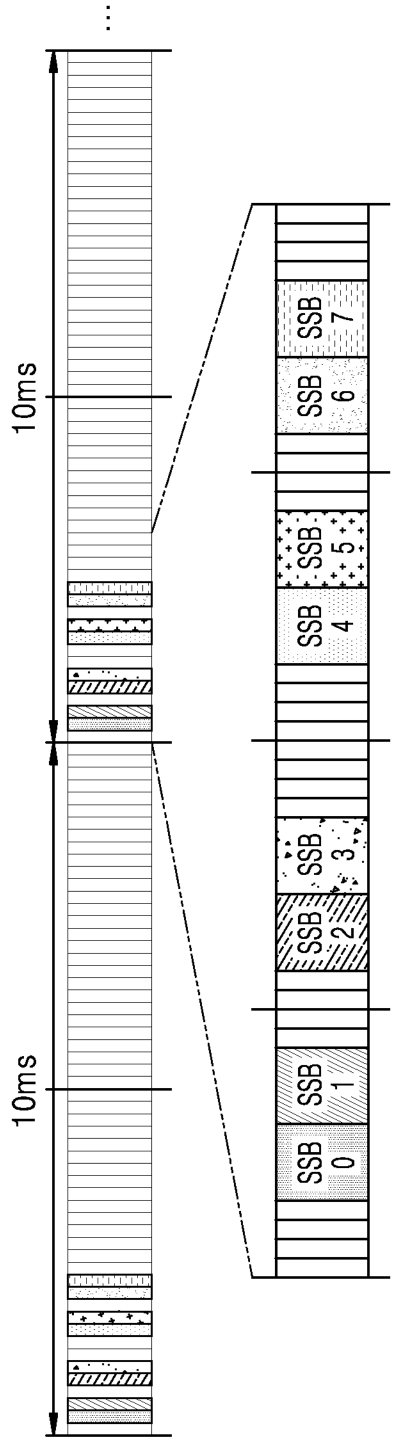
FIG. 11B illustrates an example of a BS transmitting a cell-specific signal through an RIS in each period, according to an embodiment of the disclosure.

FIGS. 11A and 11B illustrate an example of an SSB operation situation of the BS 1140 before an RIS controller 1100 accesses the BS 1140. In an embodiment, the BS 1140 may transmit SSB0 to SSB7 at 10 ms intervals before the RIS controller 1100 accesses the BS 1140.

Figure 11C:
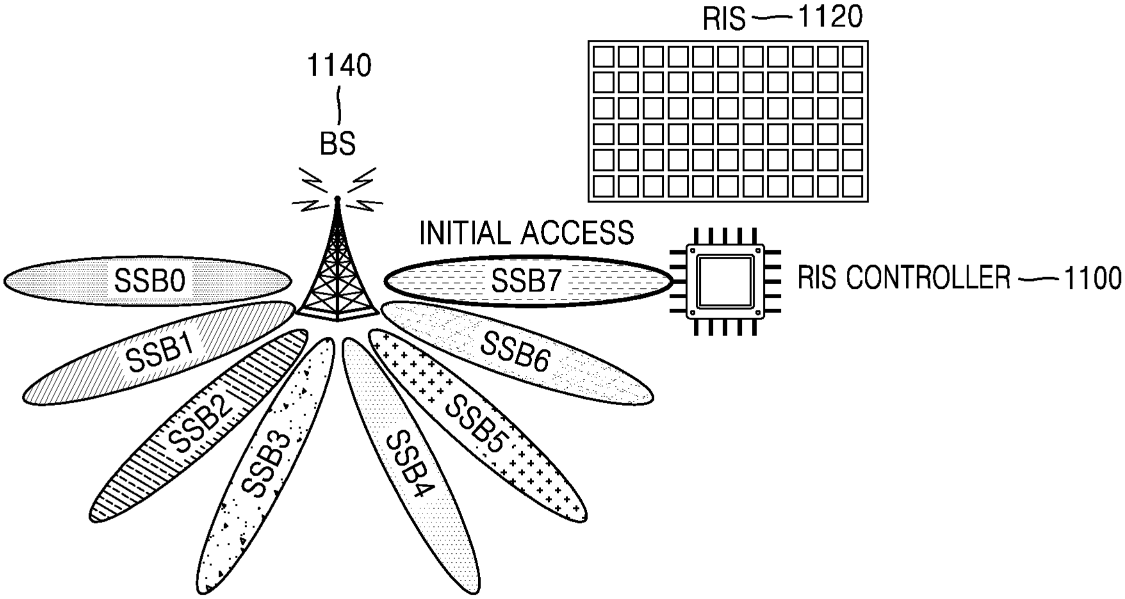
FIG. 11C illustrates an example of a BS transmitting a cell-specific signal through an RIS in each period, according to an embodiment of the disclosure.
Figure 11D:
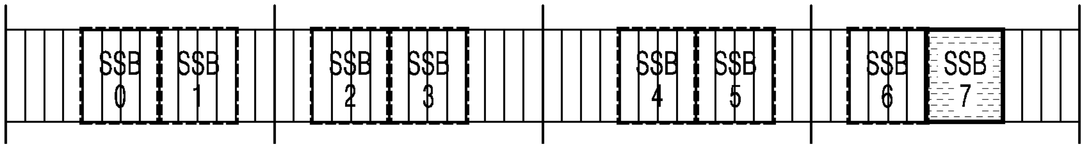
FIG. 11D illustrates an example of a BS transmitting a cell-specific signal through an RIS in each period, according to an embodiment of the disclosure.

Referring to FIG. 11C, the RIS controller 1100 may receive the SSB7 and make initial access to the BS 1140 based on the SSB7. In an embodiment, the RIS controller 1100 may identify configuration information about a physical random access channel (PRACH) and SSBs in the initial access procedure based on the SSB7. For example, referring to FIG. 11D, the RIS controller 1100 may identify transmission times of SSB0 to SSB6 and frame boundaries based on the location of the received SSB7. Furthermore, the RIS controller 1100 may identify occurrence times of PRACH occasions corresponding to the respective SSB0 to SSB7 and frame boundaries based on the location of the received SSB7.

Figure 11E:
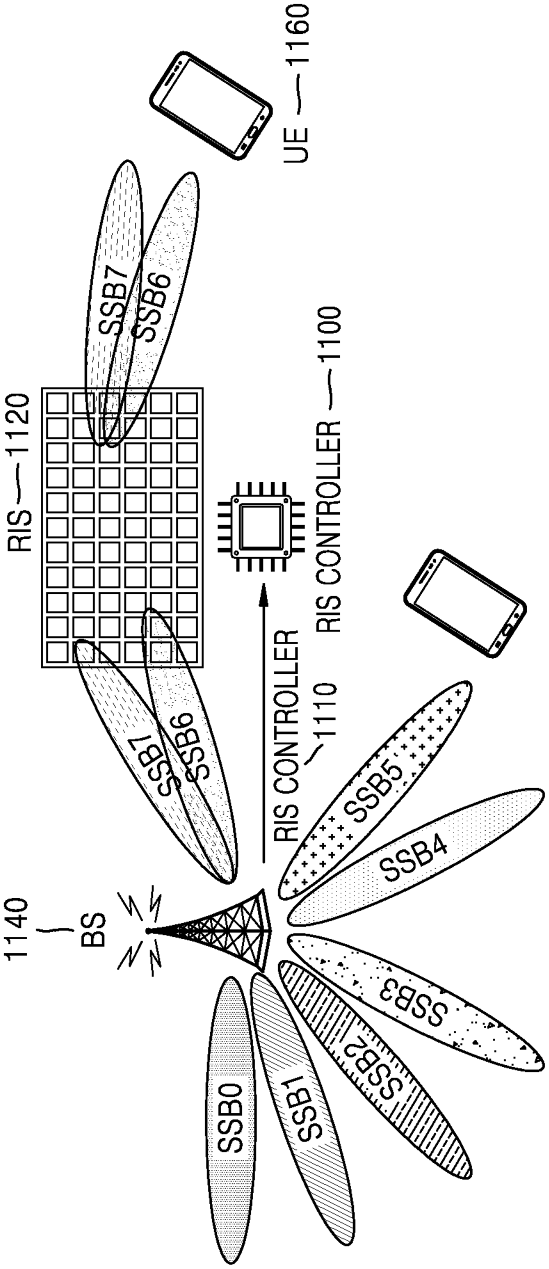
FIG. 11E illustrates an example of a BS transmitting a cell-specific signal through an RIS in each period, according to an embodiment of the disclosure.

Referring to FIG. 11E, in a case that the BS 1140 is to transmit a signal to the UE 1160 through an RIS 1120, the BS 1140 may transmit an RIS control signal 1110 to the RIS controller 1100. For example, in a case that the BS 1140 is to transmit SSB6 and SSB7 to the UE 1160 based on the RIS 1120, the BS 1140 may transmit the RIS control signal 1110 to the RIS controller 1100.

In an embodiment, the RIS control signal 1110 may include information about a signal to be transmitted by the BS 1140 to the UE 1160 and a corresponding RIS codeword index set $\{\text{SSB index } i, \phi_i\}$. For example, the RIS control signal 1110 may include $\{\text{SSB index } 6, \phi_6\}$ and $\{\text{SSB index } 7, \phi_7\}$.

Figure 11F:
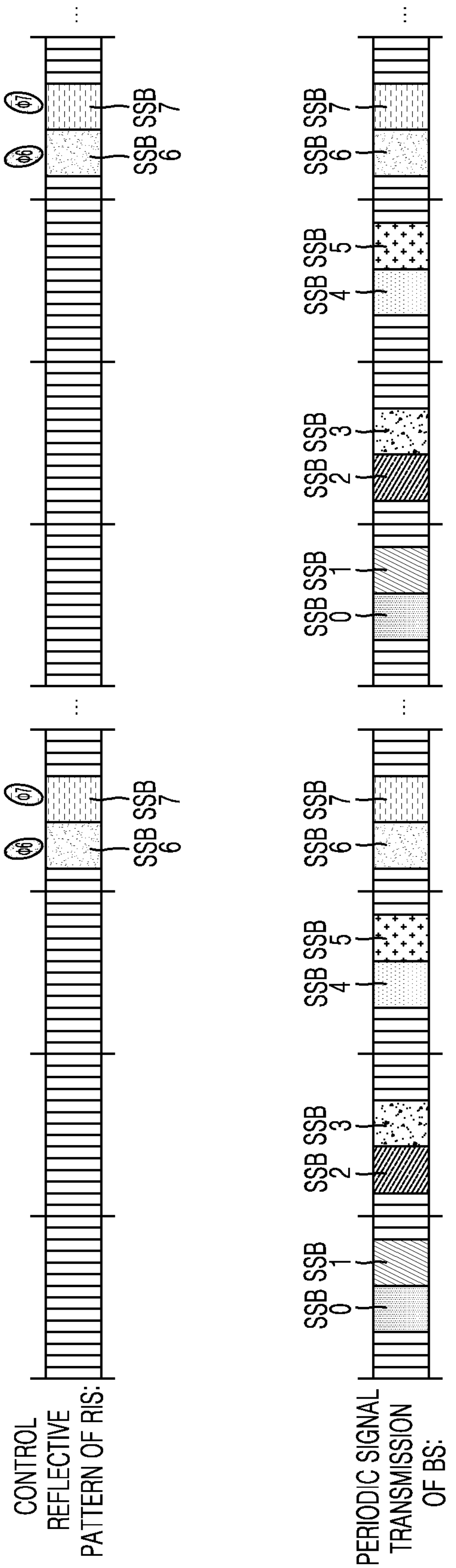
FIG. 11F illustrates an example of a BS transmitting a cell-specific signal through an RIS in each period, according to an embodiment of the disclosure.

Referring to FIGS. 11E and 11F, the RIS controller 1100 may control a reflective pattern of the RIS at particular intervals based on information about a signal included in the RIS control signal and a corresponding RIS codeword index set $\{\text{SSB index } i, \phi_i\}$. For example, the RIS controller 1110 may control a reflective pattern of the RIS 1120 according to an RIS codeword index $\phi_6$ corresponding to SSB 6 at a time of transmission of SSB6 at particular intervals. Alternatively, the RIS controller 1110 may control a reflective pattern of the RIS 1120 according to an RIS codeword index $\phi_7$ corresponding to SSB 7 at a time of transmission of SSB7 at particular intervals. Accordingly, the UE 1160 may receive the SSB6 and SSB7 reflecting off the RIS 1120.

Figure 11G:
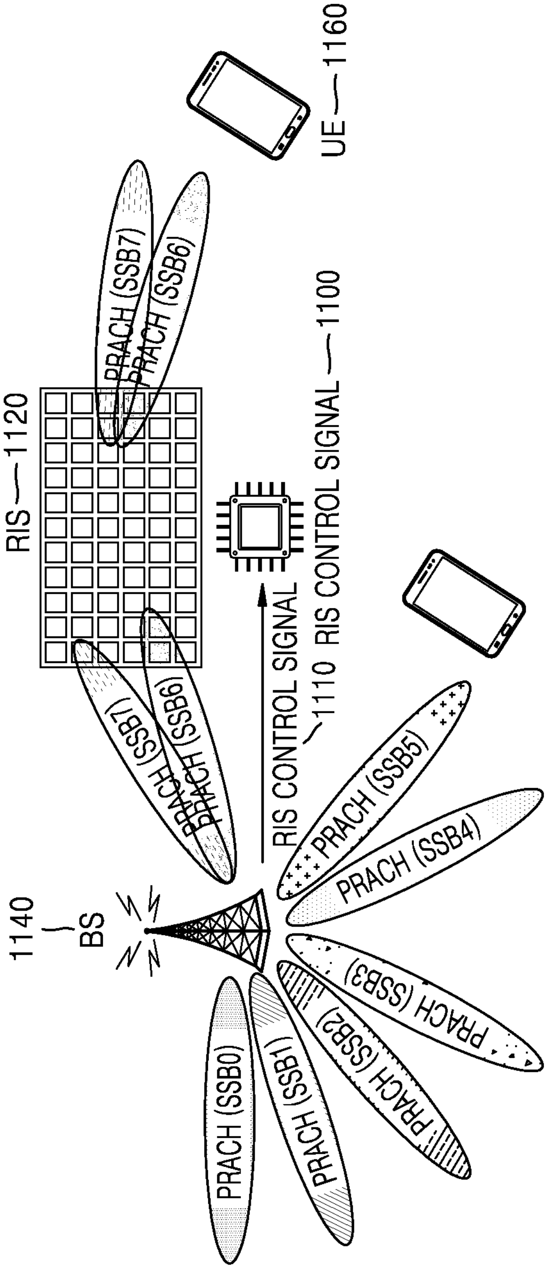
FIG. 11G illustrates an example of a BS transmitting a cell-specific signal through an RIS in each period, according to an embodiment of the disclosure.
Figure 11H:
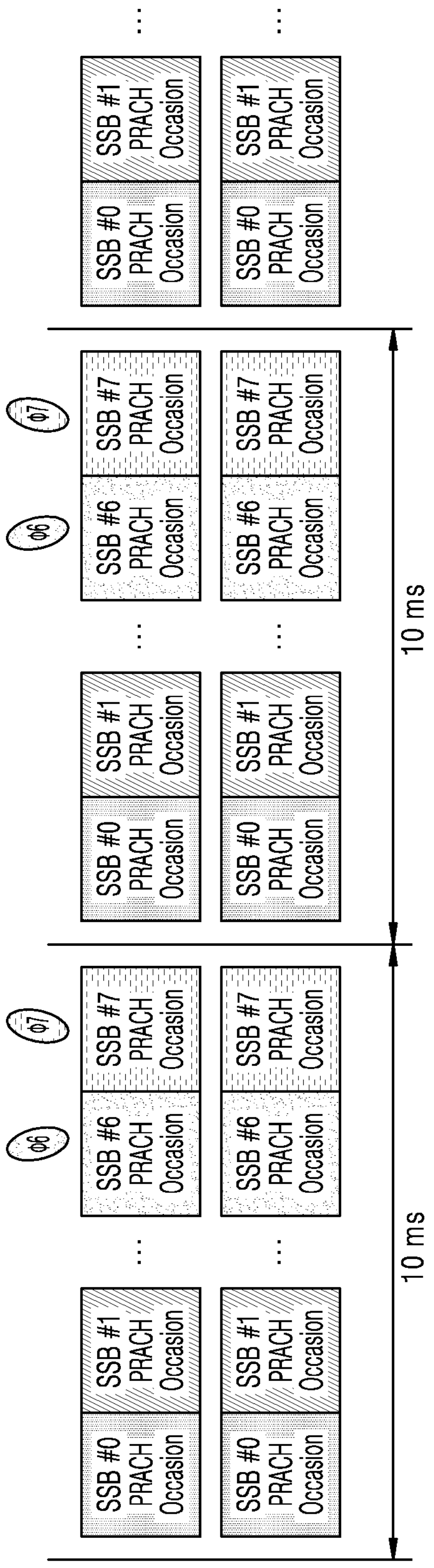
FIG. 11H illustrates an example of a BS transmitting a cell-specific signal through an RIS in each period, according to an embodiment of the disclosure.

Referring to FIGS. 11G and 11H, the RIS controller 1100 may control a reflective pattern of the RIS at particular intervals based on configuration information about a PRACH. For example, the RIS controller 1110 may control a reflective pattern of the RIS 1120 according to an RIS codeword index $\phi_6$ at a time of occurrence of a PRACH occasion corresponding to SSB 6 at particular intervals. Alternatively, the RIS controller 1110 may control a reflective pattern of the RIS 1120 according to an RIS codeword index $\phi_7$ at a time of occurrence of a PRACH occasion corresponding to SSB 7 at particular intervals. Accordingly, the BS 1140 may receive PRACH signals reflecting off the RIS 1120. In the meantime, configuration information about a PRACH may be obtained in a procedure of initial access of the RIS controller 1100 to the BS 1140.

FIGS. 12A to 12I illustrate an example of a BS transmitting a cell-specific signal through an RIS in each period, according to an embodiment of the disclosure. Contents overlapping FIGS. 11A to 11H will be omitted or described briefly.

Figure 12A:
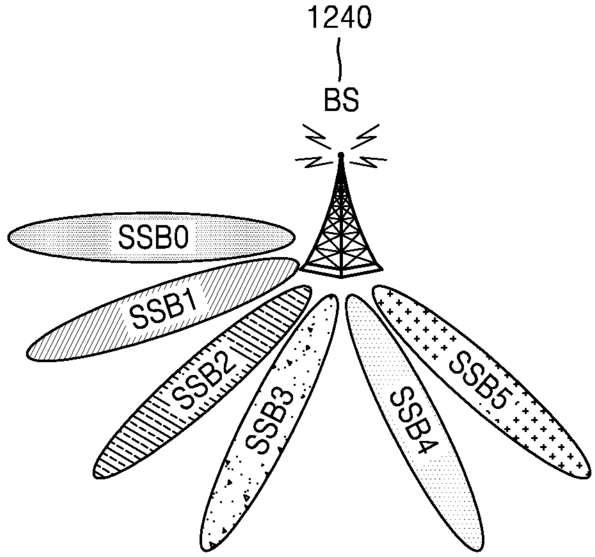
FIG. 12A illustrates an example of a BS transmitting a cell-specific signal through an RIS in each period, according to an embodiment of the disclosure.
Figure 12B:
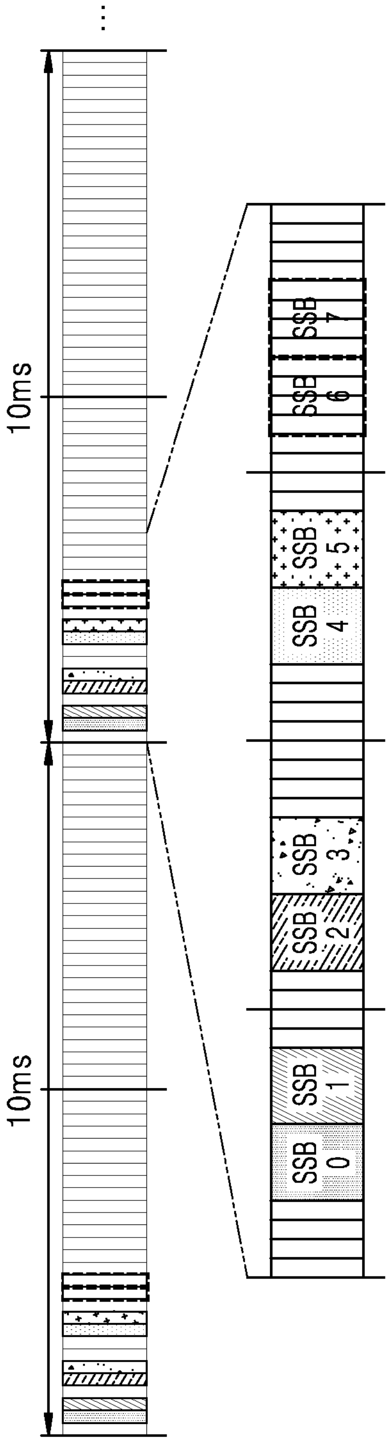
FIG. 12B illustrates an example of a BS transmitting a cell-specific signal through an RIS in each period, according to an embodiment of the disclosure.

FIGS. 12A and 12B illustrate an example of an SSB operation situation of a BS 1240 before an RIS controller 1200 accesses the BS 1240. In an embodiment, the BS 1240 may transmit SSB0 to SSB5 at 10 ms intervals before the RIS controller 1200 accesses the BS 1240.

Figure 12C:
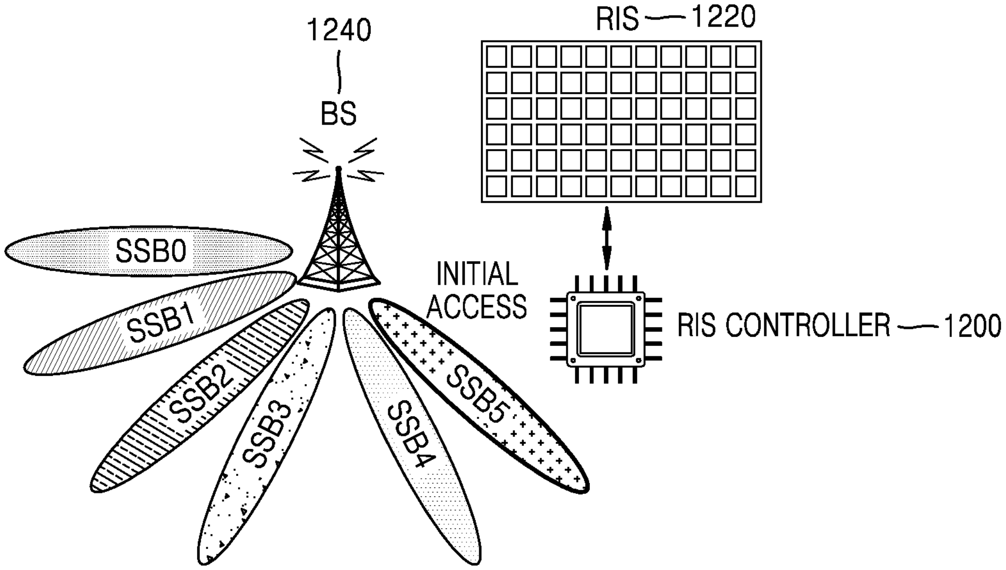
FIG. 12C illustrates an example of a BS transmitting a cell-specific signal through an RIS in each period, according to an embodiment of the disclosure.
Figure 12D:
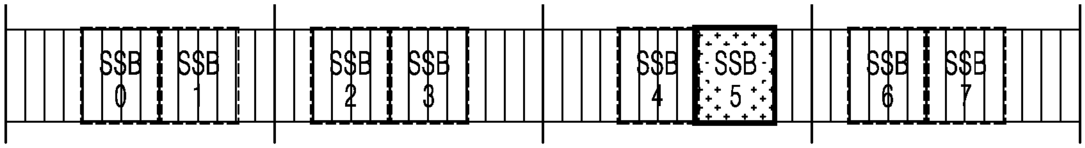
FIG. 12D illustrates an example of a BS transmitting a cell-specific signal through an RIS in each period, according to an embodiment of the disclosure.

Referring to FIG. 12C, the RIS controller 1200 may receive SSB5 and make initial access to the BS 1240 based on the SSB5. In an embodiment, the RIS controller 1200 may identify configuration information about a PRACH and an SSB in the initial access procedure based on the SSB5. For example, referring to FIG. 12D, the RIS controller 1200 may identify transmission times of SSB0 to SSB7 and frame boundaries based on the location of the received SSB5. Furthermore, the RIS controller 1200 may identify occurrence times of PRACH occasions corresponding to the respective SSB0 to SSB5 and frame boundaries based on the location of the received SSB5.

Figure 12E:
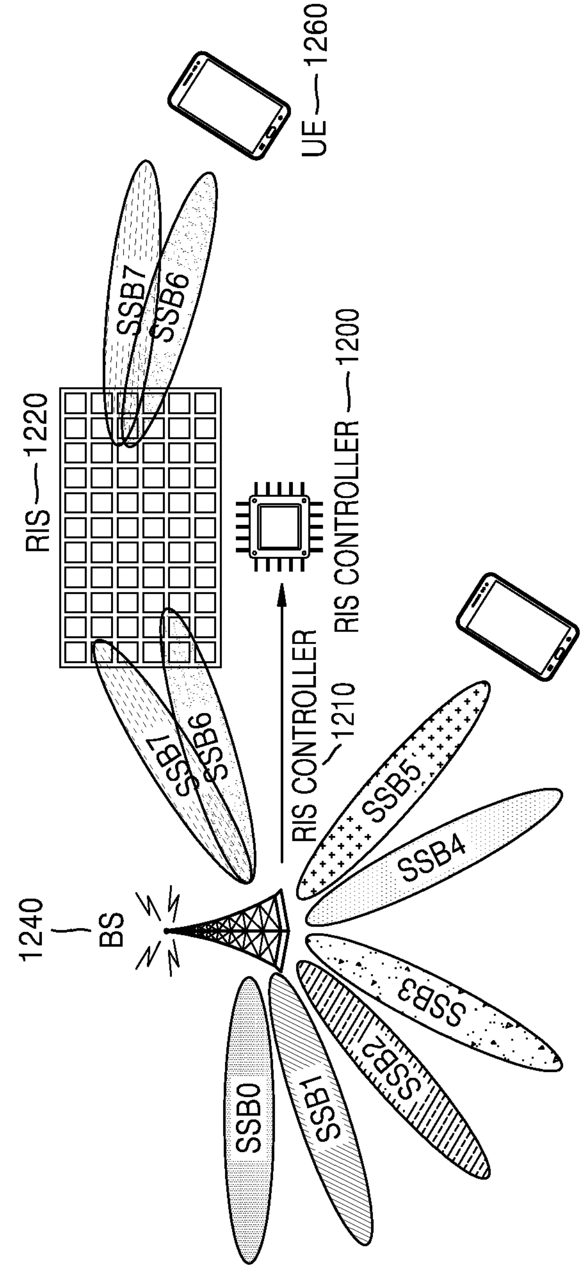
FIG. 12E illustrates an example of a BS transmitting a cell-specific signal through an RIS in each period, according to an embodiment of the disclosure.

Referring to FIG. 12E, in a case that the BS 1240 is to transmit a signal to a UE 1260 through an RIS 1220, the BS 1240 may transmit an RIS control signal 1210 to the RIS controller 1200. For example, in a case that the BS 1240 is to transmit SSB6 and SSB7 to the UE 1260 based on the RIS 1220, the BS 1240 may transmit the RIS control signal 1210 to the RIS controller 1200.

In an embodiment, the RIS control signal 1210 may include information about a signal to be transmitted by the BS 1240 to the UE 1260 and a corresponding RIS codeword index set {SSB index i, $\phi_i$}. For example, the RIS control signal 1210 may include {SSB index 6, $\phi_6$} and {SSB index 7, $\phi_7$}.

Figure 12F:
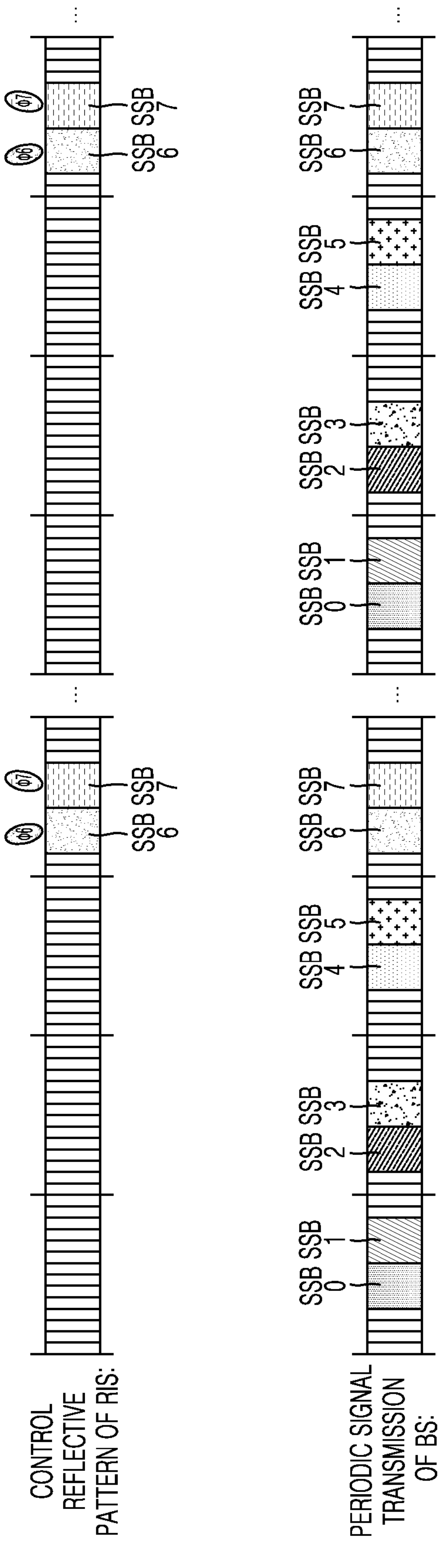
FIG. 12F illustrates an example of a BS transmitting a cell-specific signal through an RIS in each period, according to an embodiment of the disclosure.

Referring to FIGS. 12E and 12F, the RIS controller 1200 may control a reflective pattern of the RIS at particular intervals based on information about a signal included in the RIS control signal and a corresponding RIS codeword index set {SSB index i, $\phi_i$}. For example, the RIS controller 1210 may control a reflective pattern of the RIS 1220 according to an RIS codeword index 06 corresponding to SSB 6 at a time of transmission of SSB6 at particular intervals. Alternatively, the RIS controller 1210 may control a reflective pattern of the RIS 1220 according to an RIS codeword index (7 corresponding to SSB 7 at a time of transmission of SSB7 at particular intervals. Accordingly, the UE 1260 may receive SSB6 and SSB7 reflecting off the RIS 1220.

Figure 12G:
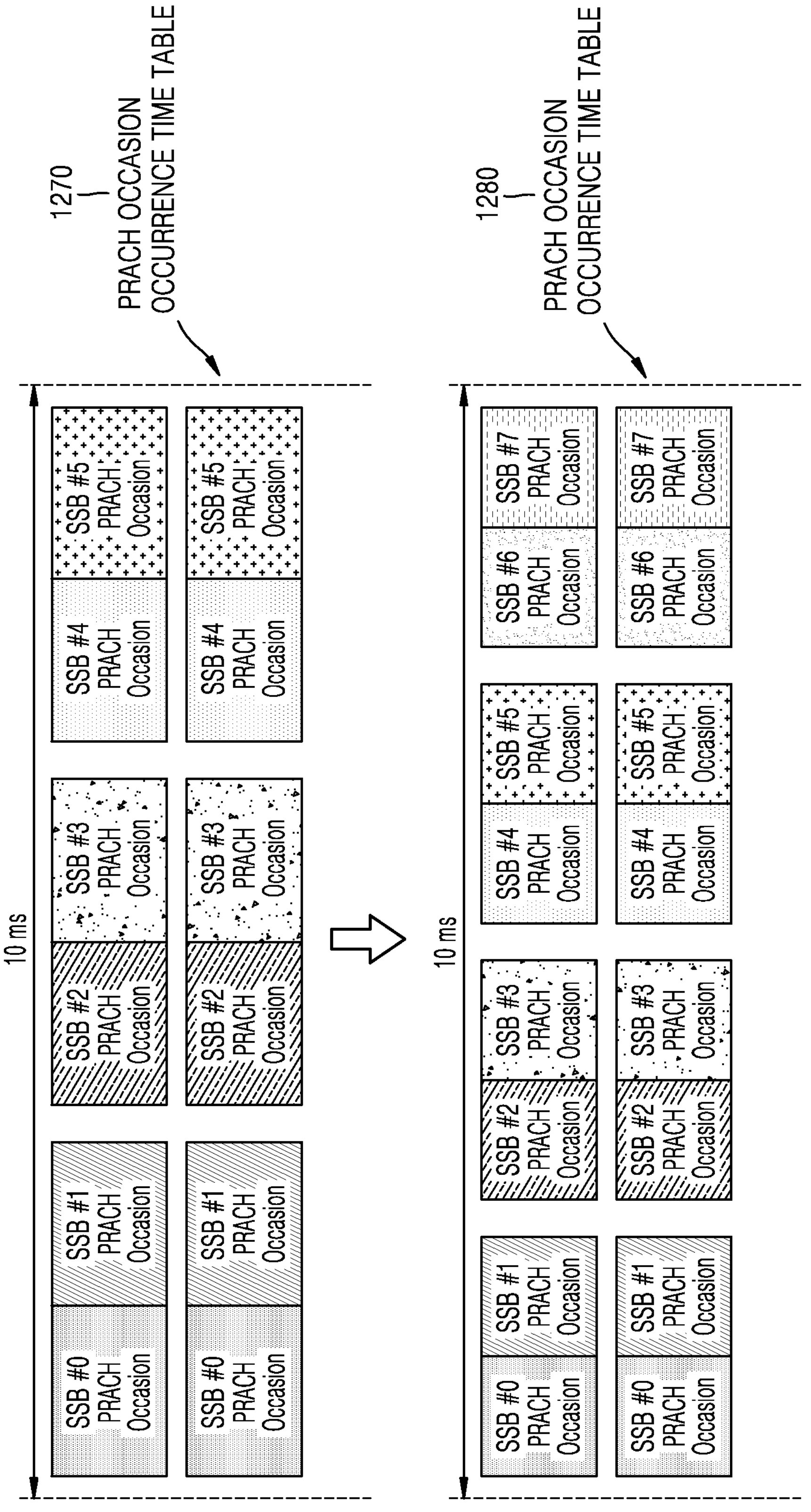
FIG. 12G illustrates an example of a BS transmitting a cell-specific signal through an RIS in each period, according to an embodiment of the disclosure.

Referring to FIG. 12G, as the number of SSBs transmitted by the BS 1240 varies, configuration information about a PRACH corresponding to each SSB may be changed. For example, the BS 1240 may transmit 6 SSBs (SSB0 to SSB5) before the RIS controller 1200 accesses the BS 1240 and transmit 8 SSBs (SSB0 to SSB7) after the RIS controller 1200 accesses the BS 1240. Accordingly, occurrence times of PRACH occasions corresponding to the respective SSBs may be changed. For example, an occurrence time table 1270 of PRACH occasions obtained by the RIS controller 1200 in the initial access procedure may be changed into an occurrence time table 1280 of PRACH occasions.

Figure 12H:
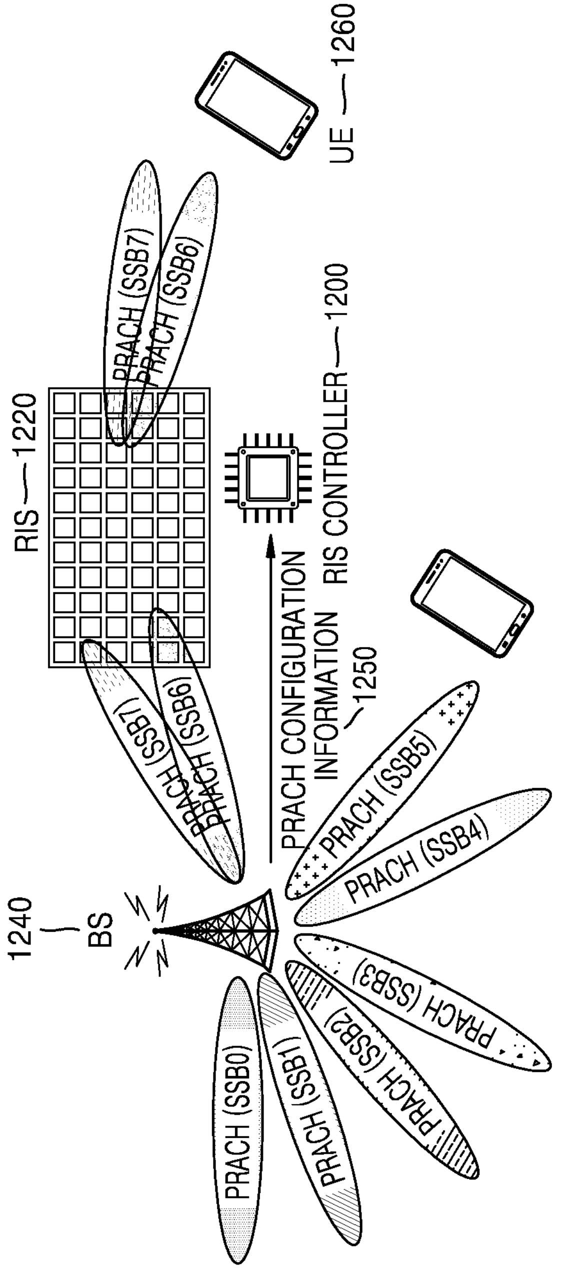
FIG. 12H illustrates an example of a BS transmitting a cell-specific signal through an RIS in each period, according to an embodiment of the disclosure.

Referring to FIG. 12H, when PRACH configuration information is changed, the BS 1240 may transmit configuration information 1250 about a new PRACH to the RIS controller 100. For example, the BS 1240 may transmit RRC parameters such as prach-ConfigurationIndex, msg1-FDM, ssb-perRACH-OccasionAndCB-PreamblesPerSSB that reflect the new configuration information to the RIS controller 100.

Figure 12I:
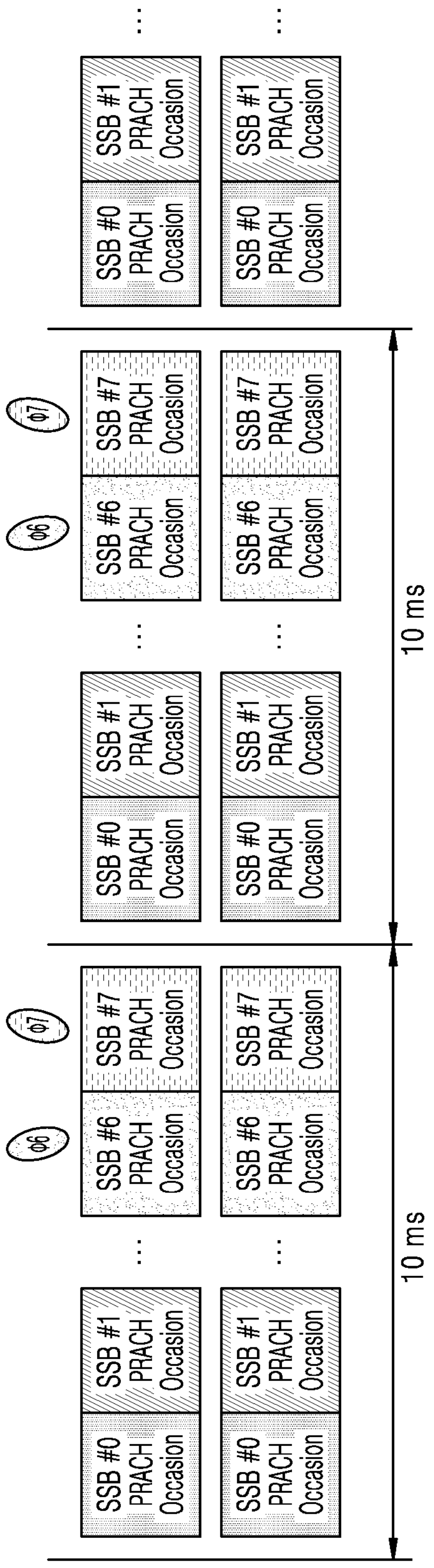
FIG. 12I illustrates an example of a BS transmitting a cell-specific signal through an RIS in each period, according to an embodiment of the disclosure.

Referring to FIGS. 12H and 12I, the RIS controller 1200 may control a reflective pattern of the RIS at particular intervals based on the configuration information 1250 about the new PRACH. For example, the RIS controller 1210 may control a reflective pattern of the RIS 1220 according to an RIS codeword index $\phi_6$ at a time of occurrence of a PRACH occasion corresponding to SSB 6 at particular intervals. Alternatively, the RIS controller 1210 may control a reflective pattern of the RIS 1220 according to an RIS codeword index $\phi_7$ at a time of occurrence of a PRACH occasion corresponding to SSB 7 at particular intervals. Accordingly, the BS 1240 may receive PRACH signals (PRACH occasions 6 and 7) reflecting off the RIS 1220.

In an embodiment, when the SSB configuration information is changed, the BS may transmit configuration information about a new SSB to the RIS controller. For example, when the SSB configuration information is changed, the BS may transmit information about a location and repetition periodicity for each SSB index to the RIS controller. Afterward, a procedure of FIGS. 11E to 11H may be performed.

In another embodiment, when the SSB and PRACH configuration information is changed, the BS may transmit configuration information about a new SSB and PRACH to the RIS controller. For example, when the SSB and PRACH configuration information is changed, the BS may transmit information about a location and repetition periodicity for each SSB index and information about PRACH transmission time and repetition periodicity to the RIS controller. Afterward, a procedure of FIGS. 12E to 12I may be performed.

Figure 13:
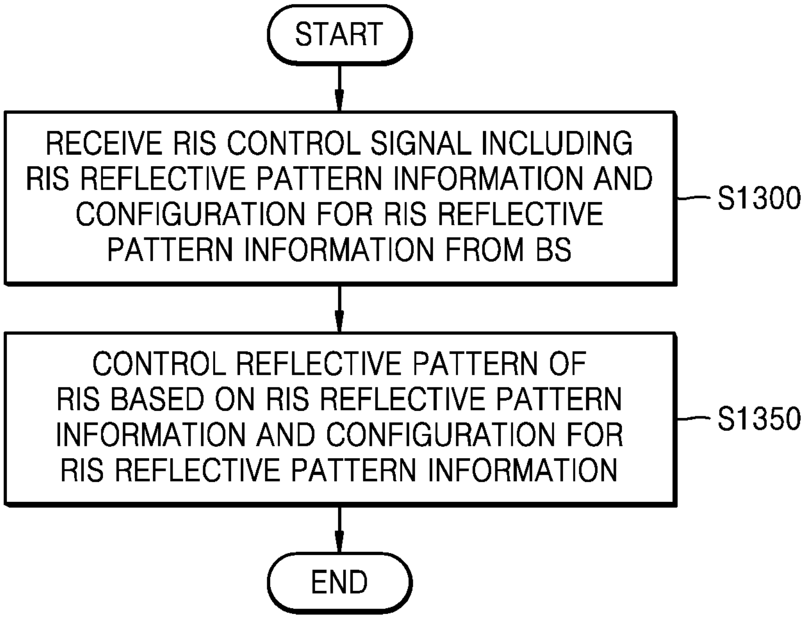
FIG. 13 is a flowchart illustrating a procedure in which an RIS controller controls a reflective pattern of an RIS, according to an embodiment of the disclosure.

FIG. 13 is a flowchart illustrating a procedure in which an RIS controller controls a reflective pattern of an RIS, according to an embodiment of the disclosure.

In operation S1300, the RIS controller may receive an RIS control signal including RIS reflective pattern information and configuration information for the RIS reflective pattern information from the BS.

In an embodiment, the RIS reflective pattern information may include information about a reflective pattern corresponding to each symbol in a slot. Furthermore, the configuration information for the RIS reflective pattern information may include information about a slot offset.

In an embodiment, the RIS reflective pattern information may include information about the number of reflective patterns corresponding to the slot and information about a set of reflective patterns sequentially corresponding to symbols in the slot. Furthermore, the configuration information for the RIS reflective pattern information may include information about a slot offset, and information about a starting symbol corresponding to each reflective pattern in the reflective pattern set. In this case, the information about the starting symbol may be represented by allocating '1' to a bit corresponding to the starting symbol, or represented by indicating an index of the starting symbol in bits.

In an embodiment, the RIS reflective pattern information may include information about the number of reflective patterns corresponding to the slot and information about a set of reflective patterns sequentially corresponding to symbols in the slot. Furthermore, the configuration information for the RIS reflective pattern information may include information about a slot offset, and information about symbol length corresponding to each reflective pattern in the reflective pattern set. In this case, the information about the symbol length may be represented by indicating a value of the symbol length in bits.

In an embodiment, the RIS reflective pattern information may include information about at least one signal transmitted in each period, and the configuration information for the RIS reflective pattern information may include information about the period.

In an embodiment, the information about the at least one signal transmitted in each period may include information about at least one reflective pattern corresponding to each of the at least one signal. Furthermore, the configuration information for the RIS reflective pattern information may include information about an SFN and a subframe number and information about a starting symbol and symbol length corresponding to each of the at least one reflective pattern.

In an embodiment, the information about the at least one signal transmitted in each period may include information about at least one reflective pattern corresponding to each of the at least one signal. Furthermore, the configuration information for the RIS reflective pattern information may include information about a timing offset and information about a starting symbol and symbol length corresponding to each of the at least one reflective pattern.

In operation S1350, the RIS controller may control a reflective pattern of the RIS based on the RIS reflective pattern information and configuration information for the RIS reflective pattern information.

In an embodiment, when the configuration information for the RIS reflective pattern information includes information about a slot offset, the RIS controller may control a reflective pattern of the RIS for each symbol based on the RIS reflective pattern information from after the lapse of the slot offset from a reception time of the RIS control signal.

In an embodiment, when the RIS reflective pattern information includes information about a reflective pattern corresponding to each symbol in the slot, the RIS controller may control a reflective pattern of the RIS for each symbol based on the reflective pattern corresponding to each symbol.

In an embodiment, when the RIS reflective pattern information includes information about the number of reflective patterns corresponding to the slot and information about a set of reflective patterns sequentially corresponding to symbols in the slot, and the configuration information for the RIS reflective pattern information includes information about a starting symbol corresponding to each reflective pattern in the reflective pattern set, the RIS controller may control a reflective pattern of the RIS for each symbol based on the information about the number of reflective patterns corresponding to the slot, the information about the set of reflective patterns sequentially corresponding to symbols in the slot, and the information about the starting symbol corresponding to each reflective pattern in the reflective pattern set.

In an embodiment, when the RIS reflective pattern information includes information about the number of reflective patterns corresponding to the slot and information about a set of reflective patterns sequentially corresponding to symbols in the slot, and the configuration information for the RIS reflective pattern information includes information about symbol length corresponding to each reflective pattern in the reflective pattern set, the RIS controller may control a reflective pattern of the RIS for each symbol based on the information about the number of reflective patterns corresponding to the slot, the information about the set of reflective patterns sequentially corresponding to symbols in the slot, and the information about the symbol length corresponding to each reflective pattern in the reflective pattern set.

In an embodiment, when the RIS reflective pattern information includes information about at least one signal transmitted in each period, and the configuration information for the RIS reflective pattern includes information about the period, the RIS controller may control a reflective pattern of the RIS based on the information about the at least one signal in each period.

In an embodiment, when the information about the at least one signal transmitted in each period includes information about at least one reflective pattern corresponding to each of the at least one signal, and the configuration information for the RIS reflective pattern information includes information about an SFN and a subframe number and information about a starting symbol and symbol length corresponding to each of the at least one reflective pattern, the RIS controller may control a reflective pattern of the RIS based on the information about the at least one reflective pattern and the information about the starting symbol and the symbol length corresponding to each of the at least one reflective pattern in each period from the subframe number of the SFN.

In an embodiment, when the information about the at least one signal transmitted in each period includes information about at least one reflective pattern corresponding to each of the at least one signal, and the configuration information for the RIS reflective pattern information includes information about a timing offset and information about a starting symbol and symbol length corresponding to each of the at least one reflective pattern, the RIS controller may control a reflective pattern of the RIS based on the information about the at least one reflective pattern and the information about the starting symbol and the symbol length corresponding to each of the at least one reflective pattern in each period from when the timing offset elapses from a reception time of the RIS control signal.

In an embodiment, when the at least one signal transmitted in each period includes a sync signal, the RIS controller may receive configuration information for the sync signal from the BS, and based on the configuration information for the sync signal, identify configuration information for a plurality of sync signals including the sync signal. Furthermore, the RIS controller may control a reflective pattern of the RIS in each period based on information about a reflective pattern corresponding to each of the at least one of the plurality of sync signals and configuration information for the at least one sync signal.

In an embodiment, the RIS controller may identify an occurrence time of each of at least one PRACH occasion corresponding to each of the at least one sync signal based on the configuration information for the sync signal. Furthermore, the RIS controller may control a reflective pattern of the RIS at a time when each PRACH occasion occurs in each period based on the information about the reflective pattern corresponding to each of the at least one sync signal.

Figure 14:
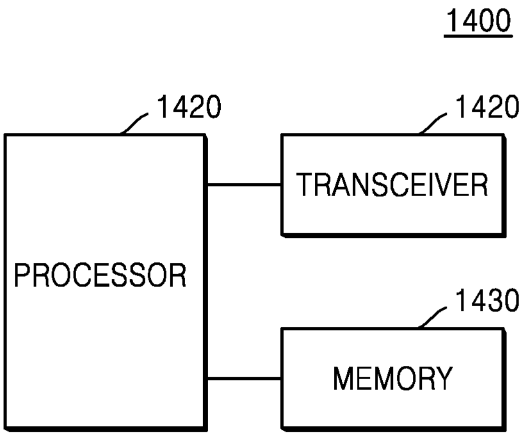
FIG. 14 is a schematic block diagram of a configuration of a network entity, according to an embodiment of the disclosure.

FIG. 14 is a schematic block diagram of a configuration of a network entity, according to an embodiment of the disclosure.

Referring to the FIG. 14, a network entity 1400 may include a processor 1410, a transceiver 1420 and a memory 1430. Components of the network entity 1400 are not, however, limited thereto. For example, the network entity 1400 may include more or fewer components than described above. In addition, the processor 1410, the transceiver 1420 and the memory 1430 may be implemented in the form of a single chip.

The processor 1410 may include one or more processors. The one or more processors may include a universal processor such as a central processing unit (CPU), an application processor (AP), a digital signal processor (DSP), etc., a graphic processing unit (GPU), a vision processing unit (VPU), etc., or a dedicated artificial intelligence (AI) processor such as a neural processing unit (NPU). When the one or more processors are the dedicated AI processors, they may be designed in a hardware structure that is specific to dealing with a particular AI model.

The processor 1410 may control a series of processes for the UE to be operated according to the embodiments of the disclosure. For example, the processor 1410 may receive control signals and data signals through the transceiver 1420 and process the received control signals and data signals. The processor 1410 may transmit the processed control signal and data signal through the transceiver 1420. Furthermore, the processor 1410 may control input data derived from the received control signal and data signal to be processed according to a predefined operation rule or AI model stored in the memory 1430.

The predefined operation rule or the AI model may be made by learning. Specifically, a predefined operation rule or an AI model being made by learning refers to the predefined operation rule or the AI model established to perform a desired feature (or an object) being made when a basic AI model is trained by a learning algorithm with a lot of training data. Such learning may be performed by the UE itself in which AI is performed according to the disclosure, or by a separate server and/or system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by learning results of the AI model. For example, the plurality of weight values may be updated to reduce or minimize a loss value or a cost value obtained by the AI model during a training procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto.

In an embodiment, the processor 1410 may control a reflective pattern of an RIS based on RIS reflective pattern information and configuration information for the RIS reflective pattern information.

A transmitter and a receiver may be collectively referred to as the transceiver 1420, and the transceiver of the network entity 1400 may transmit or receive signals to or from the BS, the RIS or the UE. The signals transmitted or received may include control information and data. For this, the transceiver 1420 may include an RF transmitter for up-converting the frequency of a signal to be transmitted and amplifying the signal and an RF receiver for low-noise amplifying a received signal and down-converting the frequency of the received signal. It is merely an example of the transceiver 1420, and the elements of the transceiver 1420 are not limited to the RF transmitter and RF receiver. In addition, the transceiver 1420 may receive a signal on a wireless channel and output the signal to the processor 1410, and transmit a signal output from the processor 1410 on a wireless channel.

The memory 1430 may store a program and data required for operation of the network entity 1400. Furthermore, the memory 1430 may store control information or data included in a signal obtained by the network entity 1400. Furthermore, the memory 1430 may store predefined operation rules or an AI model used by the network entity 1400. The memory 1430 may include a storage medium such as a read only memory (ROM), a random access memory (RAM), a hard disk, a compact disc ROM (CD-ROM), and a digital versatile disk (DVD), or a combination of storage mediums. Alternatively, the memory 1430 may not be separately present but integrated into the processor 1400.

Figure 15:
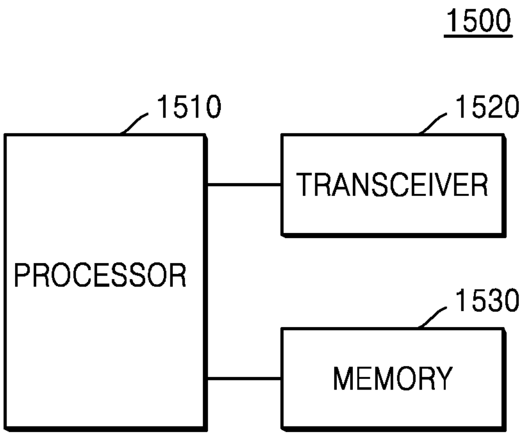
FIG. 15 is a schematic block diagram of a configuration of a BS, according to an embodiment of the disclosure.

FIG. 15 is a schematic block diagram of a configuration of a BS, according to an embodiment of the disclosure.

Referring to FIG. 15, the BS 1500 may include a processor 1510, a transceiver 1520 and a memory 1530. The processor 1510, the transceiver 1520 and the memory 1520 of the BS 1500 may operate according to the aforementioned communication method of the BS. Components of the BS are not, however, limited thereto. For example, the BS may include more or fewer components than described above. In addition, the processor 1510, the transceiver 1520 and the memory 1530 may be implemented in the form of a single chip. The processor 1510 may include one or more processors.

The processor 1510 may control a series of processes for the BS to be operated according to the embodiments of the disclosure. For example, the processor 1510 may receive a control signal and a data signal through the transceiver 1520, and process the received control signal and data signal. The processor 1510 may transmit the processed control signal and data signal through the transceiver 1520. Furthermore, the processor 1510 may control each component of the BS to configure an RIS control signal including the RIS reflective pattern information and the configuration for the RIS reflective pattern information and transmit the RIS control signal to a network entity.

A receiver of the BS 1500 and a transmitter of the BS are collectively referred to as the transceiver 1520, which may transmit or receive signals to or from a network entity or a UE. The signals to be transmitted to or received from the network entity or the network entity may include control information and data. For this, the transceiver 1520 may include an RF transmitter for up-converting the frequency of a signal to be transmitted and amplifying the signal and an RF receiver for low-noise amplifying a received signal and down-converting the frequency of the received signal. It is merely an example of the transceiver 1510, and the elements of the transceiver 1510 are not limited to the RF transmitter and RF receiver.

In addition, the transceiver 1520 may receive a signal on a wireless channel and output the signal to the processor 1510, and transmit a signal output from the processor 1510 on a wireless channel The memory 1530 may store a program and data required for an operation of the BS. Furthermore, the memory 1530 may store control information or data included in a signal obtained by the BS. The memory 1530 may include a storage medium such as a ROM, a RAM, a hard disk, a CD-ROM, and a DVD, or a combination of storage mediums. Alternatively, the memory 1520 may not be separately present but integrated into the processor 1530.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a machine-readable storage medium (e.g., a compact disc read only memory (CD-ROM)) or distributed directly between two user devices (e.g., smart phones) or online (e.g., downloaded or uploaded). In the case of the online distribution, at least part of the computer program product (e.g., a downloadable app) may be at least temporarily stored or arbitrarily created in a storage medium that may be readable to a device such as a server of the manufacturer, a server of the application store, or a relay server.

The invention claimed is:

1. A network entity comprising:

at least one transceiver;

at least one processor communicatively coupled to the at least one transceiver; and at least one memory, communicatively coupled to the at least one processor, storing instructions executable by the at least one processor to cause the network entity to:

receive, from a base station (BS), a reconfigurable intelligent surface (RIS) control signal including RIS reflective pattern information and configuration information for the RIS reflective pattern information, and control a reflective pattern of an RIS based on the RIS reflective pattern information and the configuration information for the RIS reflective pattern information, wherein the configuration information for the RIS reflective pattern information comprises at least one of:

(i) information related to a slot offset, wherein the instructions executable by the at least one processor to further cause the network entity to control the reflective pattern of the RIS for each symbol based on the RIS reflective pattern information from a slot after the slot offset elapses from a reception time of the control signal, and (ii) information related to a period, wherein the RIS reflective pattern information comprises information related to at least one signal transmitted in each period, and the instructions executable by the at least one processor to further cause the network entity to control the reflective pattern of the RIS based on the information related to the at least one signal in each period.

2. The network entity of claim 1, wherein:

the RIS reflective pattern information comprises information related to a reflective pattern corresponding to each symbol in the slot, and the instructions executable by the at least one processor to further cause the network entity to: control the reflective pattern of the RIS for each symbol based on the reflective pattern corresponding to each symbol.

3. The network entity of claim 1, wherein:

the RIS reflective pattern information comprises information related to a number of reflective patterns corresponding to the slot and information related to a set of reflective patterns sequentially corresponding to symbols in the slot, the configuration information for the RIS reflective pattern information comprises information related to a starting symbol corresponding to each reflective pattern in the reflective pattern set, the instructions executable by the at least one processor to further cause the network entity to: control the reflective pattern of the RIS for each symbol based on the information related to the number of reflective patterns corresponding to the slot, the information related to the set of reflective patterns sequentially corresponding to the symbols in the slot, and the information related to a starting symbol corresponding to each reflective pattern in the reflective pattern set.

4. The network entity of claim 1, wherein:

the RIS reflective pattern information comprises information related to a number of reflective patterns corresponding to the slot and information related to a set of reflective patterns sequentially corresponding to symbols in the slot, the configuration information for the RIS reflective pattern information comprises information related to symbol length corresponding to each reflective pattern in the reflective pattern set, the instructions executable by the at least one processor to further cause the network entity to: control the reflective pattern of the RIS for each symbol based on the information related to the number of reflective patterns corresponding to the slot, the information related to the set of reflective patterns sequentially corresponding to the symbols in the slot, and the information related to symbol length corresponding to each reflective pattern in the reflective pattern set.

5. The network entity of claim 1, wherein:

the information related to the at least one signal comprises information related to at least one reflective pattern corresponding to each of the at least one signal, the configuration information for the RIS reflective pattern information comprises information related to a system frame number (SFN) and a subframe number and information related to a starting symbol and symbol length corresponding to each of the at least one reflective pattern, and the instructions executable by the at least one processor to further cause the network entity to: control the reflective pattern of the RIS based on the information related to the at least one reflective pattern and the information related to the starting symbol and the symbol length corresponding to each of the at least one reflective pattern in each period from the subframe number of the SFN.

6. The network entity of claim 1, wherein:

the information related to the at least one signal comprises information related to at least one reflective pattern corresponding to each of the at least one signal, the configuration information for the RIS reflective pattern information comprises information related to a timing offset and information related to a starting symbol and symbol length corresponding to each of the at least one reflective pattern, and the instructions executable by the at least one processor to further cause the network entity to: control the reflective pattern of the RIS based on the information related to the at least one reflective pattern and the information related to the starting symbol and the symbol length corresponding to each of the at least one reflective pattern in each period from a time when the timing offset elapses from a reception time of the RIS control signal.

7. The network entity of claim 1, wherein:

the at least one signal transmitted in each period comprises a sync signal, and the instructions executable by the at least one processor to further cause the network entity to:

receive configuration information for the sync signal from the BS, identify configuration information for a plurality of sync signals including the sync signal based on the configuration information for the sync signal, and control the reflective pattern of the RIS in each period based on information related to a reflective pattern corresponding to each of the at least one of the plurality of sync signals and configuration information for the at least one sync signal.

8. The network entity of claim 7, the instructions executable by the at least one processor to further cause the network entity to:

identify when each of at least one physical random access channel (PRACH) occasion corresponding to each of the at least one sync signal occurs based on the configuration information for the sync signal, and control the reflective pattern of the RIS at a time when each PRACH occasion occurs in each period based on the information related to the reflective pattern corresponding to each of the at least one sync signal.

9. A method of operating a network entity in a wireless communication system, the method comprising:

receiving, from a base station, a reconfigurable intelligence surface (RIS) control signal including RIS reflective pattern information and configuration information for the RIS reflective pattern information; and controlling a reflective pattern of an RIS based on the RIS reflective pattern information and the configuration information for the RIS reflective pattern information, wherein the configuration information for the RIS reflective pattern information comprises at least one of:

(i) information related to a slot offset, wherein the method further comprises controlling the reflective pattern of the RIS for each symbol based on the RIS reflective pattern information from a slot after the slot offset elapses from a reception time of the control signal, and (ii) information related to a period, wherein the RIS reflective pattern information comprises information related to at least one signal transmitted in each period, and the method further comprises controlling the reflective pattern of the RIS based on the information related to the at least one signal in each period.

10. The method of claim 9, wherein:

the RIS reflective pattern information comprises information related to a reflective pattern corresponding to each symbol in the slot, and the controlling of the reflective pattern of the RIS comprises controlling the reflective pattern of the RIS for each symbol based on a reflective pattern corresponding to each symbol.

11. The method of claim 9, wherein the at least one signal transmitted in each period comprises a sync signal, and the method further comprises:

receiving configuration information for the sync signal from the BS; and identifying configuration information for a plurality of sync signals including the sync signal based on the configuration information for the sync signal, wherein the controlling of the reflective pattern of the RIS comprises controlling the reflective pattern of the RIS in each period based on information related to a reflective pattern corresponding to each of the at least one of the plurality of sync signals and configuration information for the at least one sync signal.

* * * * *